(12) United States Patent
Reid et al.

(10) Patent No.: US 12,322,845 B2
(45) Date of Patent: Jun. 3, 2025

(54) MOLTEN CARBONATE DIRECT CARBON FUEL CELL SYSTEMS AND METHODS

(71) Applicant: Ekona Power Inc., Burnaby (CA)

(72) Inventors: Christopher Edwin John Reid, Vancouver (CA); David Aaron Leboe, Vancouver (CA); Kenneth William Kratschmar, Vancouver (CA); Gary Edward Schubak, Vancouver (CA)

(73) Assignee: EKONA POWER INC., Vancouver (CA)

( * ) Notice: Subject to any disclaimer, the term of this patent is extended or adjusted under 35 U.S.C. 154(b) by 268 days.

(21) Appl. No.: 17/296,136

(22) PCT Filed: Dec. 9, 2019

(86) PCT No.: PCT/CA2019/051767
§ 371 (c)(1),
(2) Date: May 21, 2021

(87) PCT Pub. No.: WO2020/118418
PCT Pub. Date: Jun. 18, 2020

(65) Prior Publication Data
US 2022/0006112 A1    Jan. 6, 2022

Related U.S. Application Data

(60) Provisional application No. 62/777,823, filed on Dec. 11, 2018.

(51) Int. Cl.
*H01M 8/14* (2006.01)
*H01M 8/04014* (2016.01)
*H01M 8/04119* (2016.01)

(52) U.S. Cl.
CPC ....... *H01M 8/145* (2013.01); *H01M 8/04014* (2013.01); *H01M 8/04119* (2013.01); *H01M 2008/147* (2013.01)

(58) Field of Classification Search
CPC ............. H01M 8/145; H01M 8/04014; H01M 8/04119
See application file for complete search history.

(56) References Cited

U.S. PATENT DOCUMENTS

| 4,554,225 A | 11/1985 | Sounai et al. |
| 6,228,521 B1 | 5/2001 | Kim et al. |

(Continued)

FOREIGN PATENT DOCUMENTS

| CN | 202308175 U | 7/2012 |
| CN | 104221198 A | 12/2014 |

(Continued)

OTHER PUBLICATIONS

Ritesh Agarwal, Design and Modeling of a Novel Direct Carbon Molten Carbonate Fuel Cell with Porous Bed Electrodes, Dec. 2, 2014, Dissertation submitted to the Faculty of the Virginia Polytechnic Institute and State University (Year: 2014).*

(Continued)

*Primary Examiner* — Ula C Ruddock
*Assistant Examiner* — Armindo Carvalho, Jr.
(74) *Attorney, Agent, or Firm* — D'Ambrosio & Menon, PLLC; Usha Menon

(57) ABSTRACT

There is described a direct carbon fuel cell system. The system includes fuel cells, each fuel cell having a porous fuel cell anode and a fuel cell cathode. The system further includes a molten carbonate electrolyte and a fuel supply apparatus for flowing a fuel slurry having carbon particles and a carbon carrier fluid to the fuel cell anodes in parallel. The carbon carrier fluid has a same composition as the molten carbonate electrolyte. An oxidant supply apparatus flows an oxygen-containing stream to the fuel cell cathodes in parallel. An electrolyte circulation apparatus circulates the molten carbonate electrolyte in contact with each of the fuel (Continued)

cells. During operation of the direct carbon fuel cell system to generate electric power, carbon is oxidized at the fuel cell anodes to produce carbon dioxide, and at the fuel cell cathodes oxygen and carbon dioxide react to produce carbonate ions.

24 Claims, 19 Drawing Sheets

(56) References Cited

U.S. PATENT DOCUMENTS

| | | | |
|---|---|---|---|
| 6,815,105 | B2 | 11/2004 | Cooper et al. |
| 7,981,563 | B2 | 7/2011 | Ong et al. |
| 8,101,310 | B2 | 1/2012 | Lipilin et al. |
| 8,283,078 | B2 | 10/2012 | Cooper et al. |
| 9,040,205 | B2 | 5/2015 | Cooper |
| 9,564,650 | B2 * | 2/2017 | Harjes .................. H01M 8/145 |
| 9,837,675 | B2 | 12/2017 | Hwang et al. |
| 2006/0057443 | A1 | 3/2006 | Cooper et al. |
| 2006/0234098 | A1 | 10/2006 | Gur |
| 2009/0117429 | A1 | 5/2009 | Zillmer et al. |
| 2009/0258278 | A1 | 10/2009 | Steinberg |
| 2011/0177417 | A1 | 7/2011 | Wolk et al. |
| 2011/0177420 | A1 | 7/2011 | Wolk et al. |
| 2011/0177421 | A1 | 7/2011 | Wolk et al. |
| 2011/0177422 | A1 | 7/2011 | Wolk et al. |
| 2012/0328966 | A1 | 12/2012 | Cooper |
| 2013/0196238 | A1 * | 8/2013 | Harjes .................. H01M 8/143 |
| | | | 429/409 |
| 2013/0252044 | A1 * | 9/2013 | Fujimoto ............ H01M 4/9016 |
| | | | 29/623.1 |
| 2015/0263351 | A1 | 9/2015 | Lee et al. |
| 2018/0316033 | A1 * | 11/2018 | Evans ............... H01M 8/04186 |

FOREIGN PATENT DOCUMENTS

| | | |
|---|---|---|
| CN | 108428919 A | 8/2018 |
| KR | 20150042001 A | 4/2015 |
| WO | 2017129994 A1 | 8/2017 |

OTHER PUBLICATIONS

Donggeun Lee, Chenggo Li, Hakgyu Yi, On-Demand supply of slurry fuels to a porous anode of a direct carbon fuel cell: Attempts to increase fuel-anode contact and realize long-term operation, Journal of Power Sources, v. 309, Mar. 31, 2016, pp. 99-107, Mar. 31, 2016.

Dong Ding et al., A High-Performing Direct Carbon Fuel Cell with a 3D Architectured Anode Operated Below 600° C., Advanced Materials, 2017, 1704745, Dec. 8, 2017.

Solaiyan et al., Preparation and characterisation of porous electrodes from nickel powder for fuel cells, Central Electrochemical Research Institute, India, Jan. 6, 1999.

Ritesh Agarwal, Design and Modeling of a Novel Direct Carbon Molten Carbonate Fuel Cell with Porous Bed Electrodes, Virginia Polytechnic Institute and State University, 2014.

Shanwen Tao, Rong Lan, A simple high-performance matrix-free biomass molten carbonate fuel cell without CO2 recirculation, Science Advances, Aug. 2, 2016: e1600772, 2016.

Agarwal, R., Kornhauser, A., Energy Balance for a Direct Carbon Molten Carbonate Fuel Cell, Proceedings of the ASME Heat Transfer/Fluids Engineering Summer Conference 2004, HT/FED Mar. 2004. pp. 1-4. 10.1115/HT-FED2004-56887.

Agarwal Ritesh et al., Proceedings of the asme heat transfer/ Proceedings of the asme heat transfer/ fluids engineering summer conference 2004, pp. 341-344, Dec. 2004.

Jia Liu, "Direct carbon fuel cell anode Electrooxidation of Carbon in Direct Carbon Fuel Cell Anode", Full Text Database of Chinese Doctoral Dissertations, Jun. 15, 2018, B014-182.

Choi SH et al., "A study on the electrochemical performance of 100-cm(2) class direct carbon-molten carbonate fuel cell (DC-MCFC)", International journal of hydrogen energy, Apr. 27, 2015, pp. 5144-5149.

* cited by examiner

MOLTEN CARBONATE DIRECT CARBON FUEL CELL SYSTEMS AND METHODS

FIELD OF THE DISCLOSURE

The present disclosure relates molten carbonate direct carbon fuel cell systems and their operation.

BACKGROUND OF THE DISCLOSURE

The pursuit of direct carbon conversion to electrical power has been explored for more than a century, with past focus primarily on high carbon fuel stocks such as coal and biomass. Recent interest continues to be motivated by concerns over energy and the environment. Direct carbon fuel cells (DCFCs) are characterized by high efficiencies (theoretically 100%) and low emissions, since the primary output product is pure carbon dioxide ($CO_2$) which can be sequestered or used as an industrial feedstock in various processes. However, DCFC technology is characterized by numerous technical challenges, and has not yet reached a development stage where it is suitable for widespread commercially adoption.

Direct carbon conversion is a high temperature process that can be achieved with different fuel cell technologies, solid-oxide fuel cells (SOFC) and molten carbonate fuel cells (MCFC) being the most common types of DCFCs.

A typical molten carbonate direct carbon fuel cell (MC-DCFC) 100, is illustrated schematically in FIG. 1. As shown in FIG. 1, carbon dioxide (produced at the anode) is mixed with air at the cathode and undergoes a carbonate formation reaction—see equation (1) below. Carbonate ions formed at the cathode are conducted through a molten carbonate (MC) electrolyte where, under the right conditions at a triple phase boundary at the anode, they oxidize solid carbon fuel to produce carbon dioxide—see equation (2) below. In this case, a triple phase boundary (TPB) is a location where carbon fuel is in contact with both the ionically conductive molten carbonate electrolyte and a current carrying electrode which can conduct electrons away to the cathode via a load to complete the electrochemical reaction and produce electrical power. A portion of the product carbon dioxide produced in the carbon oxidation reaction can be separated and directed to the cathode to replenish the consumed carbonate ions and continue the reaction. The net reaction is shown in equation (3) below. On a stoichiometric basis, the cathode will consume ⅔ of the carbon dioxide produced at the anode.

$$\text{Cathode: } O_2 + 2CO_2 + 4e^- \rightarrow CO_3^{2-} \quad (1)$$

$$\text{Anode: } C(s) + 2CO_3^{2-} \rightarrow 3CO_2 + 4e^- \quad (2)$$

$$\text{Net reaction: } C(s) + O_2 \rightarrow CO_2 \quad (3)$$

In reality, there are many other reactions that can occur at temperature in a MC-DCFC. Most notably, carbon may also undergo the reverse Boudouard reaction in the presence of $CO_2$, as shown in equation (4).

$$\text{Reverse Boudouard: } C + CO_2 \leftrightarrow 2CO \quad (4)$$

This is an equilibrium reaction and does not involve the transfer of electrons. Carbon monoxide (CO) resulting from the gasification of carbon can also be consumed in the electrochemical reactions, for example, as shown in equation (5). In this case only 2 electrons are exchanged per mole of carbon instead of 4, and thus this reaction lowers the overall reaction efficiency.

$$\text{Anode: } CO + CO_3^{2-} \rightarrow 2CO_2 + 2e^- \quad (5)$$

Not all the CO produced by the reverse Boudouard reaction will necessarily be electrochemically converted, but can instead be exhausted with the product gas, again lowering the overall efficiency and, in addition, contaminating the $CO_2$ exhaust stream which can result in a need for expensive, post treatment or gas clean-up.

Unlike for gaseous fuels, ensuring solid carbon particles establish TPB sites at the anode is a considerable challenge. The mobility of carbon particles, their relative surface area available to establish electrical contact with the anode electrode, and the wettability of carbon in the electrolyte (to promote carbonate ion exchange) are all factors that need to be managed to achieve reasonable power density and carbon conversion efficiency in a DCFC.

Most of the research performed in this area to date has studied theoretical DCFC cell behavior at a fundamental electrochemical level, but industry has not yet delivered viable solutions to address the significant challenges associated with converting solid carbon to electricity in a commercially feasible manner. The technology described herein relates to a MC-DCFC systems and topologies which are more suitable for commercial application on an industrial scale.

SUMMARY OF THE DISCLOSURE

According to a first aspect of the disclosure, there is provided a direct carbon fuel cell system comprising: a plurality of fuel cells, each fuel cell comprising a porous fuel cell anode and a fuel cell cathode; a molten carbonate electrolyte; a fuel supply apparatus for flowing a fuel slurry comprising carbon particles and a carbon carrier fluid to the fuel cell anodes in parallel, wherein the carbon carrier fluid has a same composition as the molten carbonate electrolyte; an oxidant supply apparatus for flowing an oxygen-containing stream to the fuel cell cathodes in parallel; and an electrolyte circulation apparatus for circulating the molten carbonate electrolyte in contact with each of the plurality of fuel cells, wherein, during operation of the direct carbon fuel cell system to generate electric power, carbon is oxidized at the fuel cell anodes to produce carbon dioxide, and at the fuel cell cathodes oxygen and carbon dioxide react to produce carbonate ions.

The electrolyte circulation apparatus may be configured to circulate the molten carbonate electrolyte through each of the plurality of fuel cells in parallel.

Each of the fuel cells may further comprises an electrolyte flow field chamber interposed between the fuel cell anode and the fuel cell cathode, and the electrolyte circulation apparatus is further configured to circulate the molten carbonate electrolyte through the electrolyte flow field chambers in parallel.

Each of the fuel cells may further comprise an anode flow field chamber.

The fuel supply apparatus may be configured to circulate the fuel slurry through the anode flow field chambers in parallel, so that the fuel slurry contacts the fuel cell anodes, and each of the fuel cells may further comprise an electrolyte flow field chamber interposed between the fuel cell anode and the fuel cell cathode, and the electrolyte circulation apparatus may be configured to circulate the molten carbonate electrolyte through the electrolyte chambers in parallel.

The fuel supply apparatus may be configured to flow the fuel slurry to the anode flow field chambers in parallel whereby in each of the plurality of fuel cells, the fuel slurry is urged into the porous fuel cell anode so that at least some of the carbon particles contact the porous fuel cell anode and at least some of the carbon carrier fluid passes through the thickness of the porous fuel cell anode.

Substantially all of the carbon carrier fluid from the fuel slurry supplied to each anode flow field chamber may pass through the thickness of the corresponding porous fuel cell anode.

Each of the fuel cells may further comprise an electrolyte flow field chamber interposed between the fuel cell anode and the fuel cell cathode, and the fuel supply apparatus may be configured to flow the fuel slurry into the electrolyte flow field chambers in parallel.

The fuel supply apparatus may be further configured to circulate the fuel slurry through the electrolyte flow field chambers whereby, in each of the plurality of fuel cells, the fuel slurry is urged into the porous fuel cell anode so that at least some of the carbon particles contact the porous fuel cell anode and at least some of the carbon carrier fluid passes through the thickness of the porous fuel cell anode into an electrolyte return chamber, and at least some of the carbon carrier fluid exits the electrolyte flow field chambers via an outlet in the respective electrolyte flow field chamber.

The fuel supply apparatus may be further configured to circulate the fuel slurry through the electrolyte flow field chambers whereby, in each of the plurality of fuel cells, the fuel slurry is urged into the porous fuel cell anode so that at least some of the carbon particles contact the porous fuel cell anode and substantially all of the carbon carrier fluid from the fuel slurry supplied to each electrolyte flow field chamber passes through the thickness of the corresponding porous fuel cell anode into an electrolyte return chamber, and at least some of the carbon carrier fluid exits the electrolyte flow field chambers via an outlet in the respective electrolyte flow field chamber.

At least some carbon dioxide product gas produced at the fuel cell anodes may migrate through the fuel cell anodes and to the electrolyte return chambers.

The fuel supply apparatus may comprise a fuel slurry circulation apparatus configured to flow at least some of the fuel slurry that has passed through the anodes out of the electrolyte return chambers, and the electrolyte circulation apparatus may be configured to combine the at least some of the carbon carrier fluid that has exited the electrolyte flow chambers via the outlets with the at least some of the fuel slurry that has been flowed out of the electrolyte return chambers.

The fuel slurry circulation apparatus and the electrolyte circulation apparatus may each comprise one or more pumps, and the one or more pumps may be configurable to adjust respective flow rates of the at least some of the fuel slurry that has been flowed out of the electrolyte return chambers and the at least some of the carbon carrier fluid that has exited the electrolyte flow chambers via the outlets.

Each of the plurality of fuel cells may further comprise a cathode protection barrier interposed between the fuel cell cathode and its adjacent electrolyte flow field chamber.

The direct carbon fuel cell system may further comprise a gas flow path for directing at least a portion of product carbon dioxide gas produced at the fuel cell anodes to the fuel cell cathodes.

The direct carbon fuel cell system may further comprise a mixing chamber in the gas flow path, the mixing chamber for combining the at least a portion of product carbon dioxide gas produced at the fuel cell anodes with air to produce the oxygen-containing stream.

There may be no gas flow path for directing gaseous carbon dioxide from the fuel cell anodes to the fuel cell cathodes, and at least a portion of the carbon dioxide produced at the fuel cell anodes may migrate to the fuel cell cathodes via the molten carbonate electrolyte.

The oxygen-containing stream may be a liquid stream comprising molten carbonate electrolyte, oxygen, and carbon dioxide produced at the fuel cell anodes, and the oxidant supply apparatus may comprise an entrainment vessel for entraining carbon dioxide produced at the fuel cell anodes and oxygen into the molten carbonate electrolyte to produce the oxygen-containing stream.

The direct carbon fuel cell system may further comprise a heat exchanger, wherein the electrolyte circulation apparatus may be configured to further circulate the molten carbonate electrolyte through a hot side of the heat exchanger.

The plurality of fuel cells may be at least partially immersed in a molten carbonate electrolyte reservoir.

The direct carbon fuel cell system may further comprise an immersion heater in the molten carbonate electrolyte reservoir for heating the molten carbonate electrolyte.

The direct carbon fuel cell system may further comprise a heat exchanger, wherein the electrolyte circulation apparatus may be configured to circulate the molten carbonate electrolyte from the molten carbonate electrolyte reservoir, through a hot side of the heat exchanger and back to the molten carbonate electrolyte reservoir.

The fuel cells may be of a tubular design or a planar design.

Each of the porous fuel cell anodes may have an average pore size that is graded through a thickness of the fuel cell anode.

The pore size may decrease continuously or in a stepwise manner in a direction of flow of fuel slurry through the porous fuel cell anode.

Each of the plurality of porous fuel cell anodes may comprise a structural support member for providing structural rigidity to its respective porous fuel cell anode.

The structural support member may serve as a current collector for its respective porous fuel cell anode.

According to a further aspect of the disclosure, there is provided a method for operating a direct carbon fuel cell system to generate electric power, the system comprising a plurality of fuel cells, each fuel cell comprising a porous fuel cell anode and a fuel cell cathode, wherein the method comprises: supplying a fuel slurry comprising carbon particles and a carbon carrier fluid to the fuel cell anodes in parallel, wherein the carbon carrier fluid has a same composition as the molten carbonate electrolyte; supplying an oxygen-containing stream to the fuel cell cathodes in parallel; and circulating the molten carbonate electrolyte in contact with each of the plurality of fuel cells, whereby carbon is oxidized at the fuel cell anodes to produce carbon dioxide, and at the fuel cell cathodes oxygen and carbon dioxide react to produce carbonate ions.

Circulating the molten carbonate electrolyte in contact with each of the plurality of fuel cells may comprise circulating the molten carbonate electrolyte through each of the plurality of fuel cells in parallel.

Each of the fuel cells may comprise an electrolyte flow field chamber interposed between the fuel cell anode and fuel cell cathode, and circulating the molten carbonate electrolyte in contact with each of the plurality of fuel cells may comprise circulating the molten carbonate electrolyte through the electrolyte flow field chambers in parallel.

Each of the fuel cells may comprise an anode flow field chamber.

Each of the fuel cells may further comprise an electrolyte flow field chamber interposed between the fuel cell anode and the fuel cell cathode, and supplying the fuel slurry comprising carbon particles and the carbon carrier fluid to the fuel cell anodes in parallel may comprise circulating the fuel slurry through the anode flow field chambers in parallel, so that the fuel slurry contacts the fuel cell anodes; and circulating the molten carbonate electrolyte in contact with each of the plurality of fuel cells comprises circulating the molten carbonate electrolyte through the electrolyte flow field chambers in parallel.

Supplying the fuel slurry comprising carbon particles and the carbon carrier fluid to the fuel cell anodes in parallel may comprise circulating the fuel slurry to the anode flow field chambers in parallel whereby the fuel slurry is urged into the porous fuel cell anodes so that at least some of the carbon particles contact the porous fuel cell anodes and at least some of the carbon carrier fluid passes through thicknesses of the porous fuel cell anodes.

Substantially all of the carbon carrier fluid from the fuel slurry supplied to each anode flow field chamber may pass through a thickness of the corresponding porous fuel cell anode.

Each of the fuel cells may comprise an electrolyte flow field chamber interposed between the fuel cell anode and fuel cell cathode, and circulating the molten carbonate electrolyte in contact with each of the plurality of fuel cells may comprise supplying the fuel slurry into the electrolyte flow field chambers in parallel.

Supplying the fuel slurry comprising carbon particles and the carbon carrier fluid to the fuel cell anodes in parallel may comprise circulating the fuel slurry through the electrolyte flow field chambers whereby, in each of the plurality of fuel cells, the fuel slurry is urged into the porous fuel cell anode so that at least some of the carbon particles contact the porous fuel cell anode and at least some of the carbon carrier fluid passes through a thickness of the porous fuel cell anode into an electrolyte return chamber, and at least some of the carbon carrier fluid exits the electrolyte flow field chambers via an outlet in the respective electrolyte flow field chamber.

Supplying the fuel slurry comprising carbon particles and the carbon carrier fluid to the fuel cell anodes in parallel may comprise circulating the fuel slurry through the electrolyte flow field chambers whereby, in each of the plurality of fuel cells, the fuel slurry is urged into the porous fuel cell anode so that at least some of the carbon particles contact the porous fuel cell anode and substantially all of the carbon carrier fluid from the fuel slurry supplied to each electrolyte flow field chamber passes through a thickness of the corresponding porous fuel cell anode.

The method may further comprise flowing at least some of the fuel slurry that has passed through the anodes out of the electrolyte return chambers, and combining the at least some of the carbon carrier fluid that has exited the electrolyte flow chambers via the outlets with the at least some of the fuel slurry that has been flowed out of the electrolyte return chambers.

The method may further comprise adjusting respective flow rates of the at least some of the fuel slurry that has been flowed out of the electrolyte return chambers and the at least some of the carbon carrier fluid that has exited the electrolyte flow chambers via the outlets.

Each of the plurality of fuel cells may further comprise a cathode protection barrier interposed between the fuel cell cathode and its adjacent electrolyte flow field chamber.

The method may further comprise directing at least a portion of product carbon dioxide gas produced at the fuel cell anodes to the fuel cell cathodes.

The method may further comprise combining the at least a portion of product carbon dioxide gas produced at the fuel cell anodes with air to produce the oxygen-containing stream.

At least a portion of the carbon dioxide produced at the fuel cell anodes may migrate to the fuel cell cathodes via the molten carbonate electrolyte, and gaseous carbon dioxide may not be supplied from the fuel cell anodes to the fuel cell cathodes.

The method may further comprise preparing the oxygen-containing stream as a liquid stream comprising molten carbonate electrolyte, oxygen, and carbon dioxide produced at the fuel cell anodes.

The method may further comprise circulating the molten carbonate electrolyte through a hot side of a heat exchanger.

The plurality of fuel cells may be at least partially immersed in a molten carbonate electrolyte reservoir.

The method may further comprise heating the molten carbonate electrolyte in the molten carbonate electrolyte reservoir using an immersion heater.

The method may further comprise circulating the molten carbonate electrolyte from the molten carbonate electrolyte reservoir, through a hot side of the heat exchanger and back to the molten carbonate electrolyte reservoir.

The fuel cells may be of a tubular design or a planar design.

Each of the plurality of porous fuel cell anodes may have an average pore size that is graded through a thickness of the fuel cell anode.

The pore size may decrease continuously or in a stepwise manner in a direction of flow of fuel slurry through the porous fuel cell anode.

Each of the plurality of porous fuel cell anodes may comprise a structural support member for providing structural rigidity to its respective porous fuel cell anode.

The structural support member may serve as a current collector for its respective porous fuel cell anode.

According to a further aspect of the disclosure, there is provided a direct carbon fuel cell system comprising: multiple fuel cells, each fuel cell comprising: a porous anode; a cathode; and an electrolyte flow field chamber between the anode and the cathode; an electrolyte circulation apparatus for circulating a molten carbonate electrolyte in contact with the fuel cells; a fuel supply apparatus for flowing a fuel slurry comprising carbon particles to the anodes; an oxidant supply apparatus for flowing an oxygen-containing stream to the cathodes; wherein, during operation of the direct carbon fuel cell system: at the anodes, carbon of the carbon particles is oxidized to produce a carbon dioxide product gas; at least some of the carbon dioxide product gas flows from the anodes to the cathodes via the electrolyte flow field chambers; and at the cathodes, the at least some of the carbon dioxide product gas reacts with oxygen of the oxygen-containing stream to produce carbonate ions.

The direct carbon fuel cell system may comprise any of the features described above in connection with the first aspect of the disclosure.

According to a further aspect of the disclosure, there is provided a direct carbon fuel cell system comprising: multiple fuel cells, each fuel cell comprising: a porous anode; and a cathode; an electrolyte circulation apparatus for circulating a molten carbonate electrolyte in contact with the fuel cells; a fuel supply apparatus for flowing a fuel slurry comprising carbon particles to the anodes; and an oxidant supply apparatus for flowing a liquid oxygen-containing stream to the cathodes, wherein the liquid oxygen-containing stream comprises at least some of the molten carbonate electrolyte, wherein, during operation of the fuel cell: at the anode, carbon of the carbon particles is oxidized to produce carbon dioxide product gas; and at the cathode, carbon dioxide product gas reacts with oxygen of the liquid oxygen-containing stream to produce carbonate ions.

The direct carbon fuel cell system may comprise any of the features described above in connection with the first aspect of the disclosure.

Further aspects and example embodiments are illustrated in the accompanying drawings and/or described in the following description.

BRIEF DESCRIPTION OF THE DRAWINGS

The accompanying drawings illustrate non-limiting example embodiments of the disclosure. The drawings are not intended to be to scale, and in most cases are schematic or simplified intended to clearly illustrate various aspects of the disclosure.

DETAILED DESCRIPTION OF ILLUSTRATIVE EMBODIMENT(S)

Throughout the following description, specific details are set forth in order to provide a more thorough understanding of the disclosure. However, the disclosure may be practiced without these particulars. In other instances, well known aspects or features have not been shown or described in detail to avoid unnecessarily obscuring the disclosure. Accordingly, the specification and drawings are to be regarded in an illustrative, rather than a restrictive sense.

Use of a Common Electrolyte Reservoir for a Plurality of MC-DCFC Cells

Figure 1:
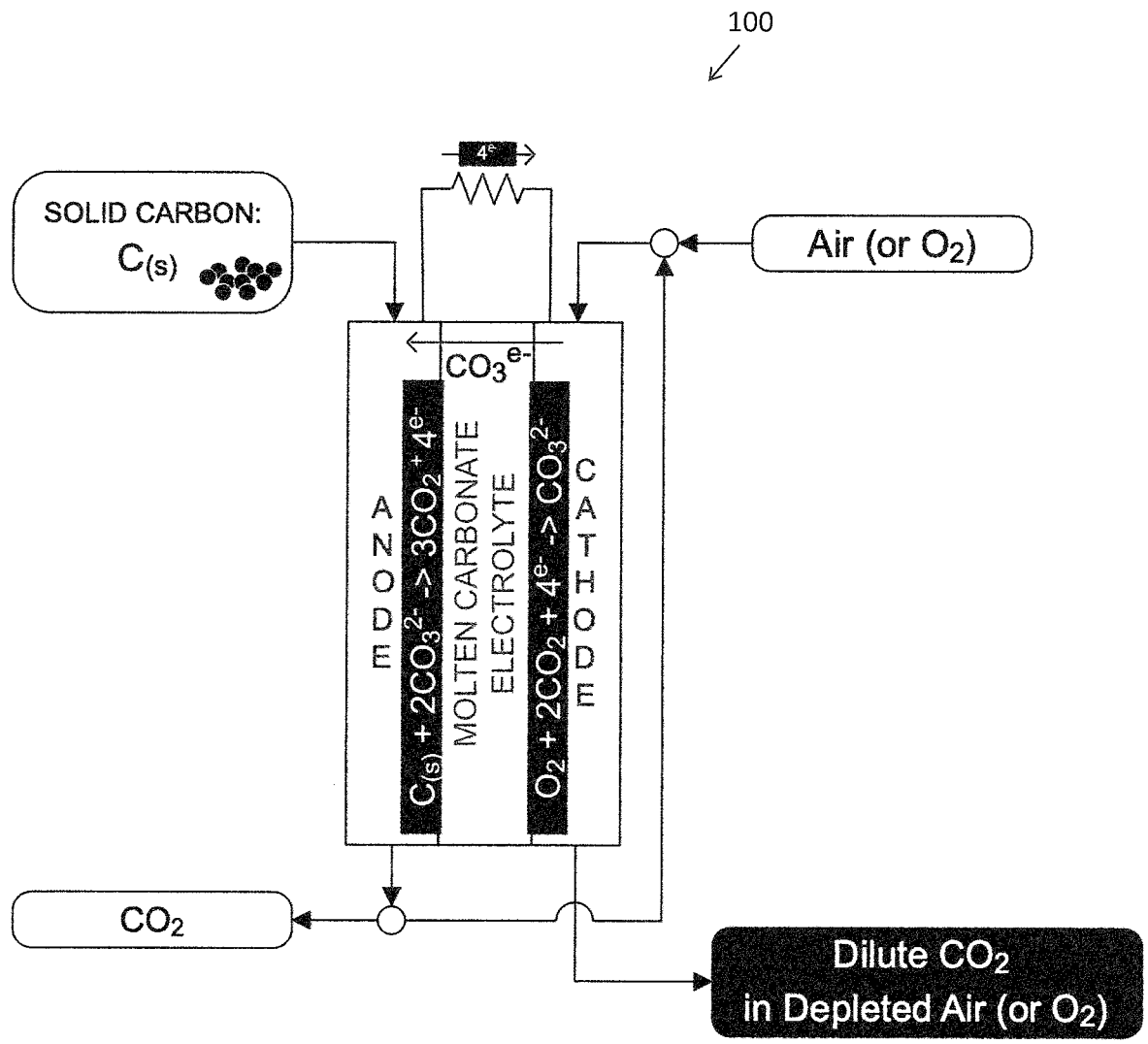
FIG. 1 is a schematic illustration of a conventional molten carbonate direct carbon fuel cell (MC-DCFC).
Figure 2:
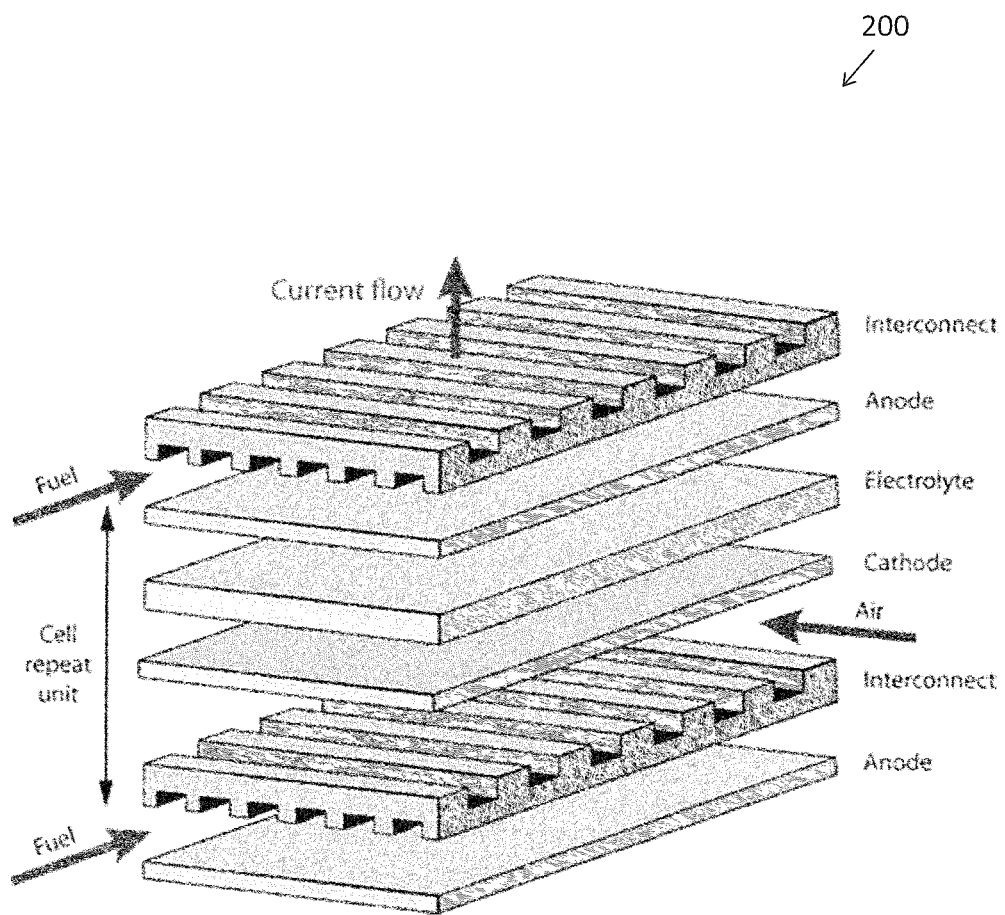
FIG. 2 is an exploded view of a molten carbonate fuel cell assembly with the electrolyte entrained in a porous matrix interposed between the anode and cathode.

Conventional MCFCs employ a captive electrolyte which is entrained in a separator matrix sandwiched between anode and cathode. In the example fuel cell assembly 200 illustrated in FIG. 2, the electrolyte is entrained in a porous matrix, such as a nickel foam interposed between the anode and cathode. This cell/stack design facilitates a bi-polar configuration in which current is serially passed from cell to cell through-plane (rather than via edge connection). Solid electrolyte is infused in the porous matrix and sealed into the cell. When heated to working temperature, the eutectic electrolyte (molten carbonate) melts and becomes ionically conductive. The entrained electrolyte is trapped in the porous matrix by tuning the porosity of the cathode and anode to ensure ions can travel freely from cathode to anode, but electrolyte does not exit the matrix, i.e. the porous structure of the electrodes is such that a gas-liquid boundary is maintained.

During normal operation of such a MCFC, the electrolyte can degrade and/or slowly escape the matrix requiring frequent service and electrolyte reconditioning. To service the electrolyte, the MCFC stack must generally be disassembled, refurbished and rebuilt. This adds significant and undesirable operating costs, which can become untenable commercially at an industrial scale.

Further, because the electrolyte is captive in the porous matrix, it cannot be used as a heat exchange fluid. Stack cooling is therefore typically accomplished by flow of an independent heat transfer medium, and/or by increasing flow of air and $CO_2$ to the cathode, so that these gaseous reactant streams are also used for cooling. These approaches to thermal management can add to the capital and operating cost of the fuel cell stack and balance of plant, and may increase the quantity of dilute $CO_2$ emissions in the cathode exhaust.

Some or all of these challenges can be mitigated by using a common electrolyte which can be delivered to and discharged from individual fuel cells without stack disassembly. This may be accomplished by use of a common electrolyte bath or reservoir in which the fuel cells are immersed, or a flow path design which directs electrolyte from a common reservoir to flow to and from the individual fuel cells. A mobile or flowing electrolyte can also serve as cooling medium to remove heat from the fuel cells during operation of the stack.

Thus, one aspect of the present technology involves the use of common reservoir of molten carbonate (Li, Na or K molten salt) electrolyte. The term "common reservoir" is used herein to refer to a common bath or vessel in which multiple cell electrodes are immersed, and to configurations in which the electrolyte is a shared fluid between the cells of a MC-DCFC stack, for example, where individual cell flow field chambers are fed from a common electrolyte reservoir via headers or manifolds. A MC-DCFC with a common electrolyte reservoir can be used for MC-DCFCs with either planar or tubular cells.

The electrolyte can be the same fluid that is used to transport or deliver the carbon fuel to the anode. Such fluid is also referred to herein as the "carbon fuel mediator" or "carbon carrier fluid". In some embodiments, thermal management (heating or cooling of the stack) is also provided by the electrolyte, for example, by directing it through a heat exchanger. In some embodiments, immersion heaters in the bath are used to heat the molten carbonate electrolyte at start-up.

Figure 3:
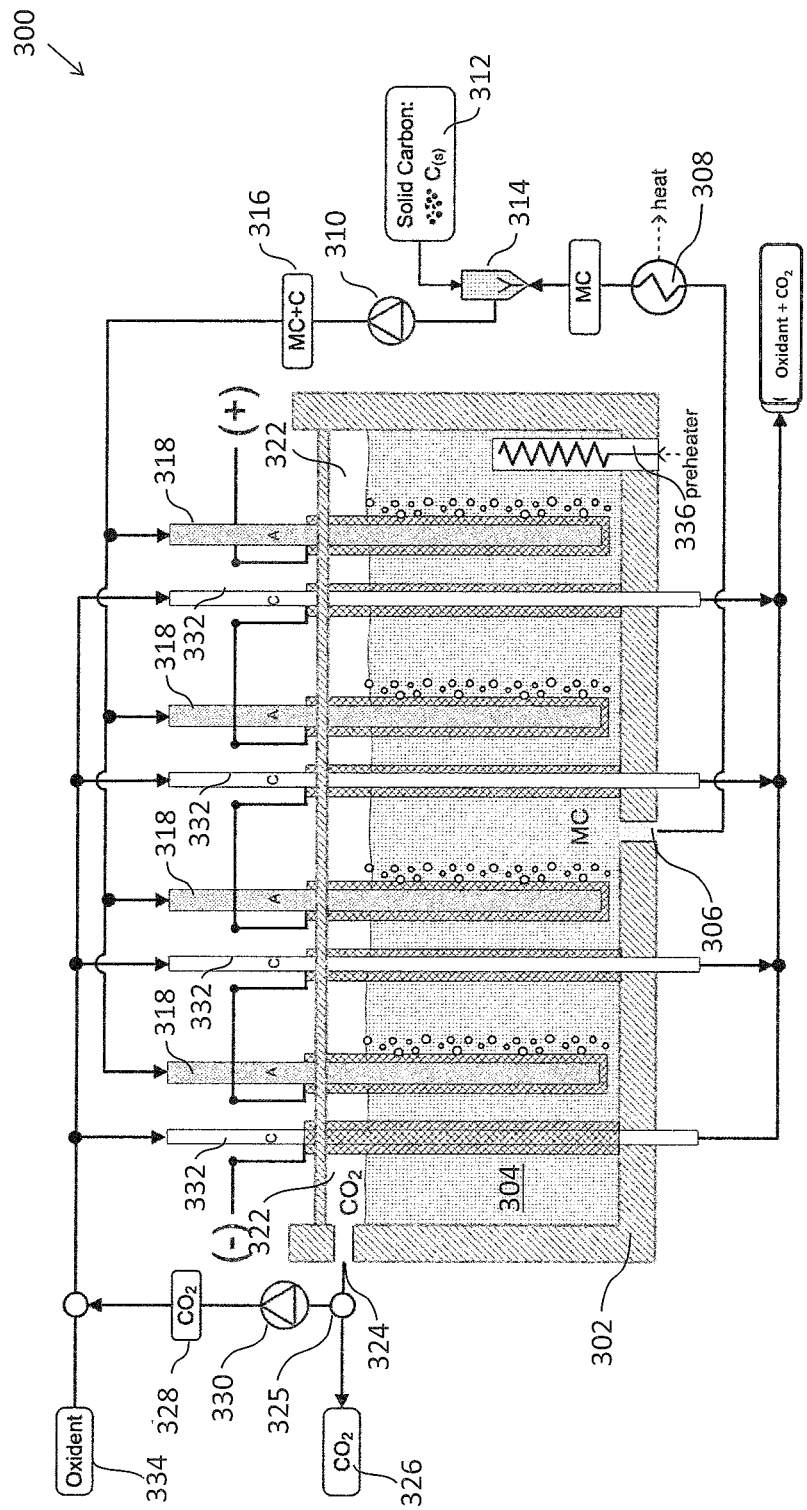
FIG. 3 is a schematic illustration of an embodiment of a molten carbonate fuel cell system with a plurality of direct carbon fuel cells immersed in a common electrolyte reservoir.

FIG. 3 illustrates an embodiment of a MC-DCFC system 300, comprising a reservoir 302, which contains a molten carbonate electrolyte 304. Electrolyte 304 is circulated from reservoir 302 via an outlet 306 to an external heat exchanger 308 using a circulation pump 310. This allows for removal of heat generated by the electrochemical DCFC reaction and absorbed by the molten electrolyte. Solid carbon particles from a fuel supply 312 are introduced into the circulating electrolyte and combined with the electrolyte in a mixer 314, and then delivered as a carbon slurry 316 (part molten carbonate electrolyte, part solid carbon fuel) to the individual DCFC anodes 318. The fuel cells depicted in FIG. 3 can represent fuel cells with tubular or planar type architecture. The carbon slurry can be delivered to an interior cylindrical cavity of a porous tubular anode, or to a cavity disposed between a pair of planar anodes. Thus, in MC-DCFC system 300, molten electrolyte 304 also serves as a carbon carrier fluid. Mixer 314 can be a device which incorporates and entrains the carbon particles into the molten electrolyte (melt) and facilitates the wetting of the carbon particles. For example, mixer 314 can comprise a hopper or tank with active or passive agitation, and/or an integrated carbon separator where carbon is extracted from other process streams, such as from a pyrolyzer exhaust stream.

Figure 7A:
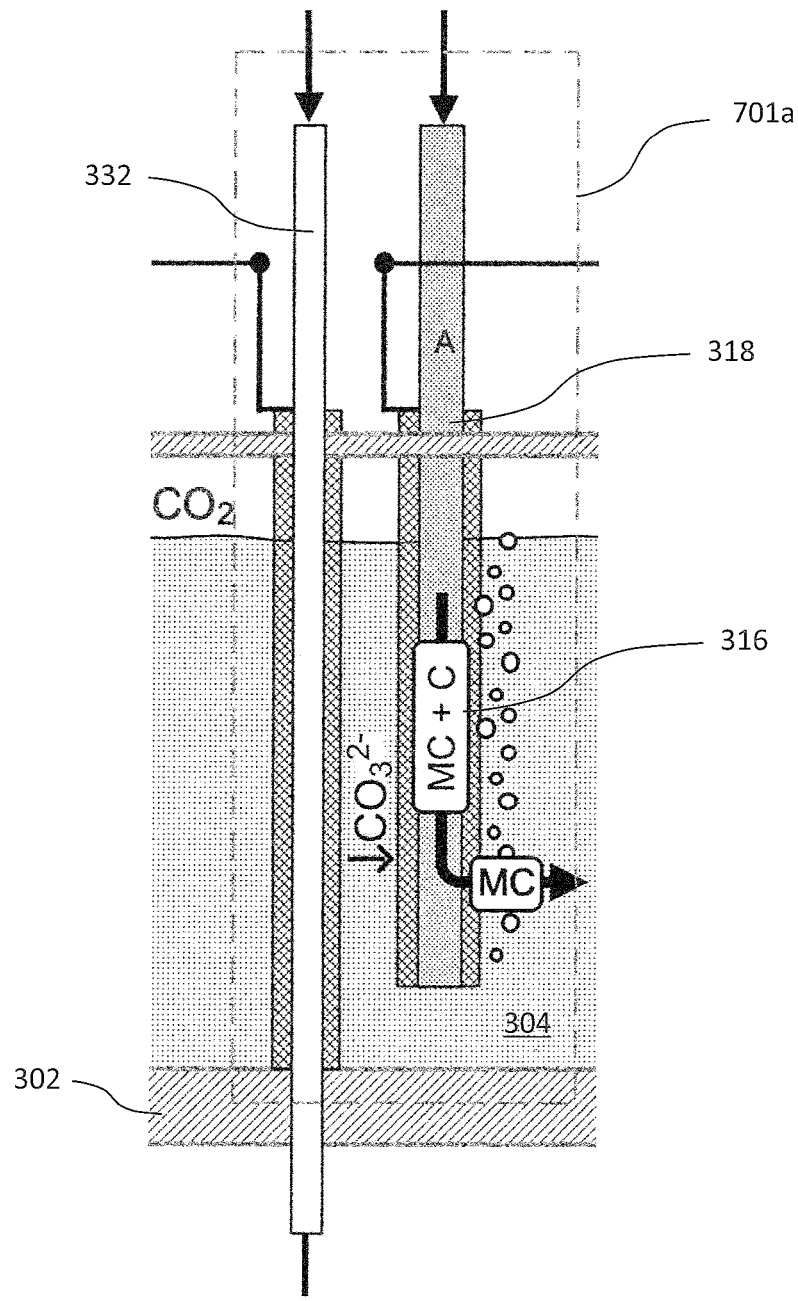
FIG. 7A is a schematic illustration of an embodiment of a direct carbon fuel cell unit cell with a flow-through porous anode.
Figure 7B:
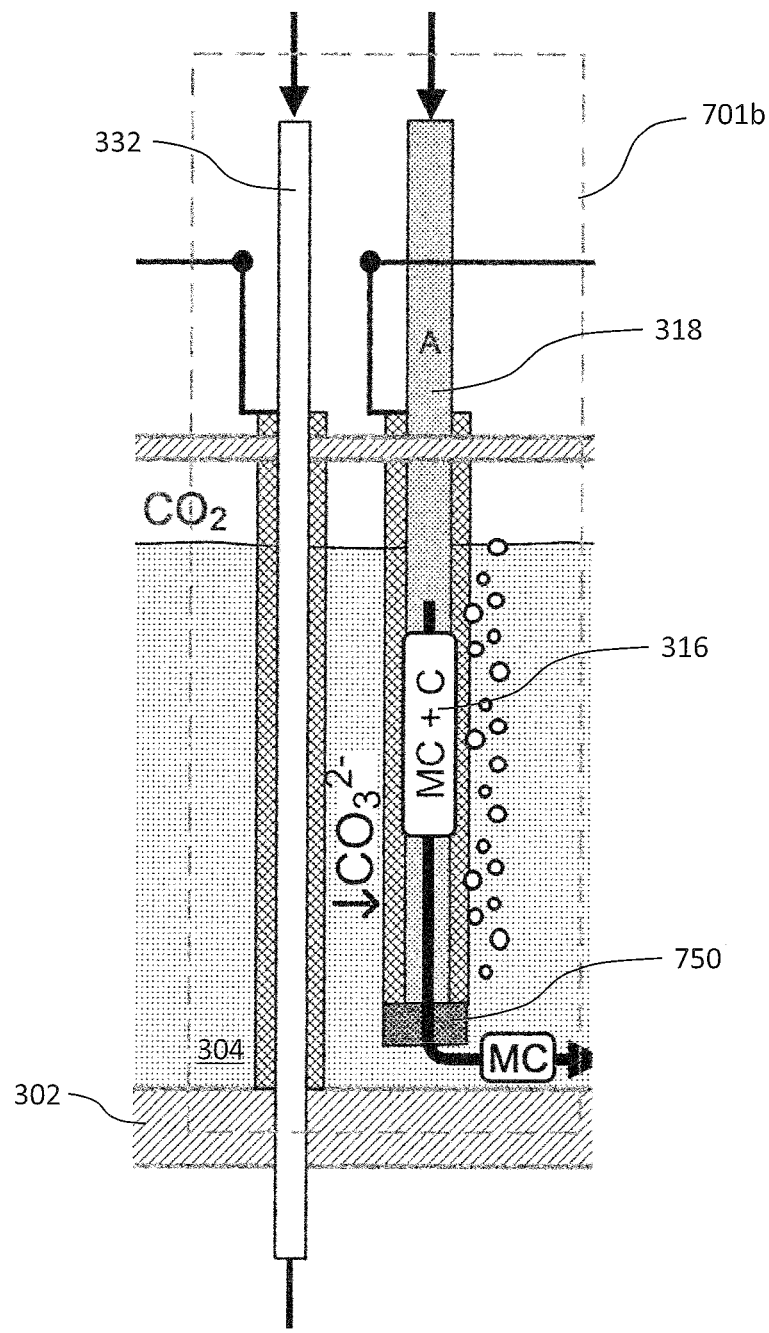
FIG. 7B is a schematic illustration of an embodiment of a direct carbon fuel cell unit cell with a flow-through anode comprising a separate filter element.

Individual DCFC anodes 318 each comprise a porous electrode separating the carbon slurry 316 from the electrolyte 304 in reservoir 302. The porosity of the electrode facilitates carbon contact, sufficient to promote electrochemical exchange of electrons at triple phase boundary (TPB) sites where the carbon fuel is in electrical contact with the anode, and in ionic contact with the electrolyte. The molten carbonate, as carbon carrier fluid, helps ensure the carbon is wetted, which facilitates contact with carbonate ions in the electrolyte. The porous anodes permit the carbon carrier fluid (MC) to pass into and, in this case, through the anode, and serve to effectively trap or filter the carbon fuel from the slurry. The carbon carrier fluid (MC) having passed through the anode rejoins the bulk electrolyte 304 in reservoir 302. Solid carbon particles, which are trapped at the porous anode, are consumed in the oxidation reaction forming product $CO_2$ gas, which accumulates in the headspace 322 in the upper portion of electrolyte reservoir 302. In some embodiments, the filtering function of porous anodes 318 can be performed by a separate filter element rather than the electrode itself (for example, as shown in FIG. 7B). In some embodiments, if the fuel loading is sufficiently high, the carbon slurry may simply flow over the surface of the porous anode without passing through the thickness of anode material, i.e. in a "flow-by" configuration rather than a "flow-through" configuration. Further description related to filtering or concentrating the carbon slurry at the DCFC anode is provided below, including in reference to FIGS. 5, 7A and 7B.

Product $CO_2$ gas can be discharged from reservoir headspace 322 through an exhaust port 324 and split into two streams at 325, one DCFC exhaust stream 326, and one recirculation stream 328 which is circulated via recirculation compressor 330 to the individual DCFC cathodes 332 together with an oxidant stream (such as air or pure oxygen) from oxidant supply 334, for the carbonate formation reaction.

Electrolyte 304 in reservoir 302 can be pre-heated using a heater 336. Heater can be, for example, an immersion heater, a heat exchanger or an integrated heating element within reservoir 302, or in another tank or reservoir fluidly connected to reservoir 302.

Figure 4:
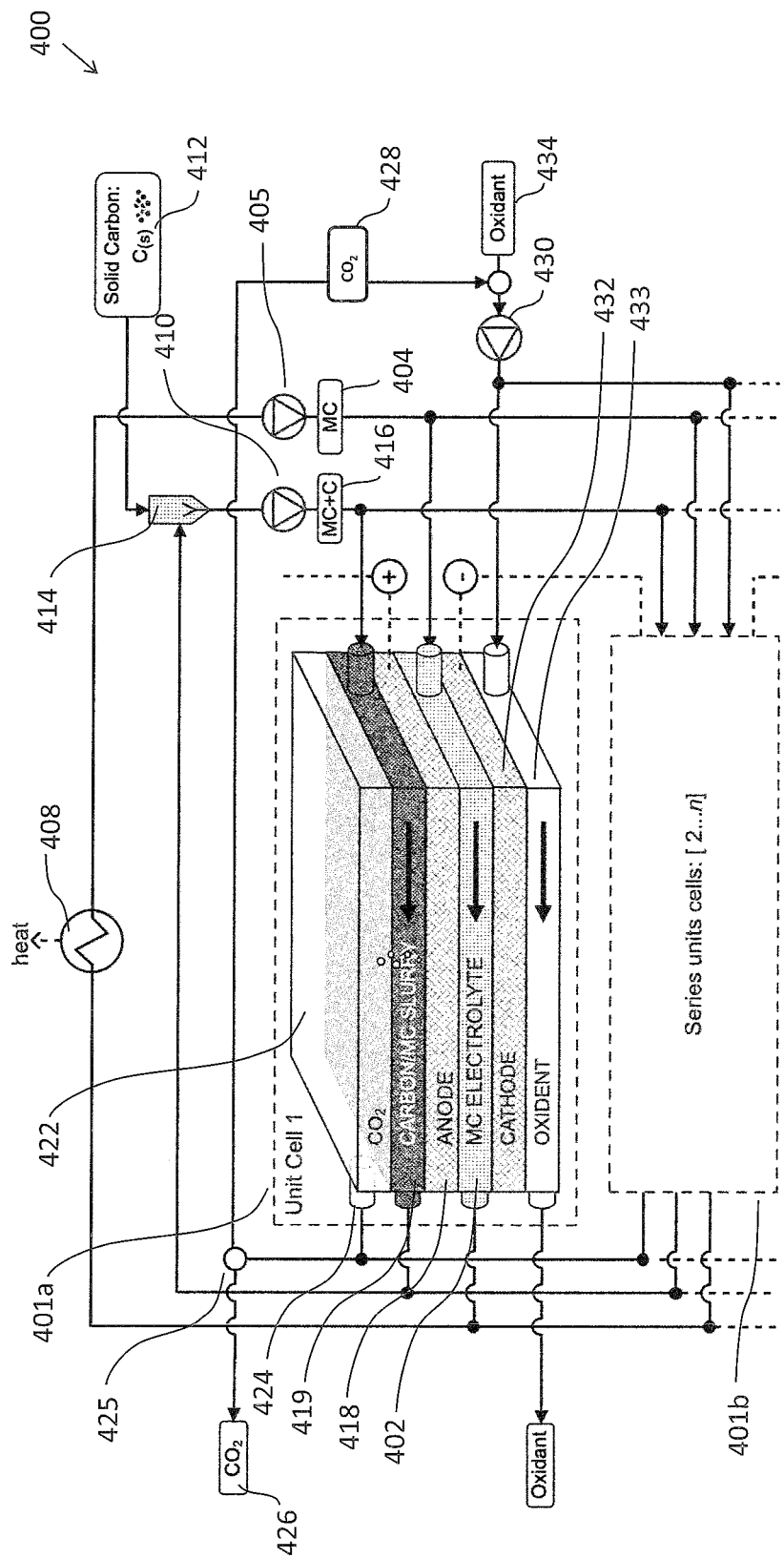
FIG. 4 is a schematic illustration of an embodiment of a molten carbonate direct carbon fuel cell system with molten carbon electrolyte circulation, carbon fuel slurry circulation and a flow-by anode configuration.

FIG. 4 illustrates an embodiment of a MC-DCFC system 400 in which the electrolyte is a shared fluid among the cells of a MC-DCFC stack, with individual cell fluid flow field chambers being fed from a common electrolyte reservoir via common headers or manifolds. Thus, in system 400 the molten carbonate electrolyte and the carbon fuel slurry (again with the electrolyte serving as the carbon carrier fluid) is delivered to the electrodes by way of cell level flow field chambers, rather the DCFCs being immersed in a common reservoir as in system 300 of FIG. 3. The term flow field chamber is used herein to refer to a chamber or plenum via which fluids, such as the electrolyte or reactant streams, are directed to and/or from individual fuel cells or fuel cell electrodes. A flow field chamber optionally contains discrete channels, flow passages, flow paths or other flow modification features for directing the flow of fluid through the flow field chamber.

FIG. 4 depicts a single unit cell 401a within a DCFC stack comprising a plurality of fuel cells electrically connected in series as indicated at 401b. The reactants and molten electrolyte are delivered to each cell by way of fluid flow field chambers.

In this configuration a molten carbonate electrolyte 404 is fed in parallel to electrolyte flow field chamber 402 in each of individual fuel cells in the DCFC stack, and then through an external heat exchanger 408, using a circulation pump 405. In each cell, the electrolyte flow field chamber 402 allows the circulating electrolyte to contact both fuel cell anode 418 and fuel cell cathode 432. Heat exchanger 408 allows for removal of heat generated by the electrochemical DCFC reaction and absorbed by the molten electrolyte. In this embodiment, the electrolyte is the primary thermal fluid used to extract heat generated during the electrochemical reaction. In another flow circuit in system 400, solid carbon particles from a fuel supply 412 are introduced into and combined with molten carbon electrolyte in a mixer 414, and the resulting carbon/electrolyte slurry 416 (part molten carbonate electrolyte, part solid carbon fuel) is circulated in parallel to the anode flow field chambers 419 of the individual DCFC anodes 418 using circulation pump 410. Thus, in MC-DCFC system 400, molten electrolyte also serves as a carbon carrier fluid. Within each anode flow field chamber 419 as the slurry flows by the anode, solid carbon interacts with anode 418 and carbonate ions transported by the molten electrolyte to establish an oxidation reaction at TPB sites. If the cells are oriented horizontally (as shown in FIG. 4) or otherwise appropriately, evolved $CO_2$ gas may rise into a header area 422 above the flowing carbon/electrolyte slurry, and product $CO_2$ gas can be discharged via $CO_2$ exhaust port 424. Alternatively, product $CO_2$ gas can be carried out of the cells with the carbon/electrolyte slurry and then be separated externally. The latter approach can eliminate the need for an internal $CO_2$ header, and the cells can be oriented differently, such as vertically.

Product $CO_2$ gas exiting each fuel cell via $CO_2$ exhaust port 424 can be split into two streams at 425, one DCFC exhaust stream 426, and one recirculation stream 428 which is circulated via recirculation compressor 430 to the cathode flow field chamber 433 of each individual DCFC cathode 432, together with an oxidant stream (such as air or pure oxygen) from oxidant supply 434.

Each unit cell can be supplied with fuel slurry and electrolyte from a common header or process volume such that only one stack- or system-sized pump and heat exchanger is required for multiple, or all the unit cells in the system.

Figure 5:
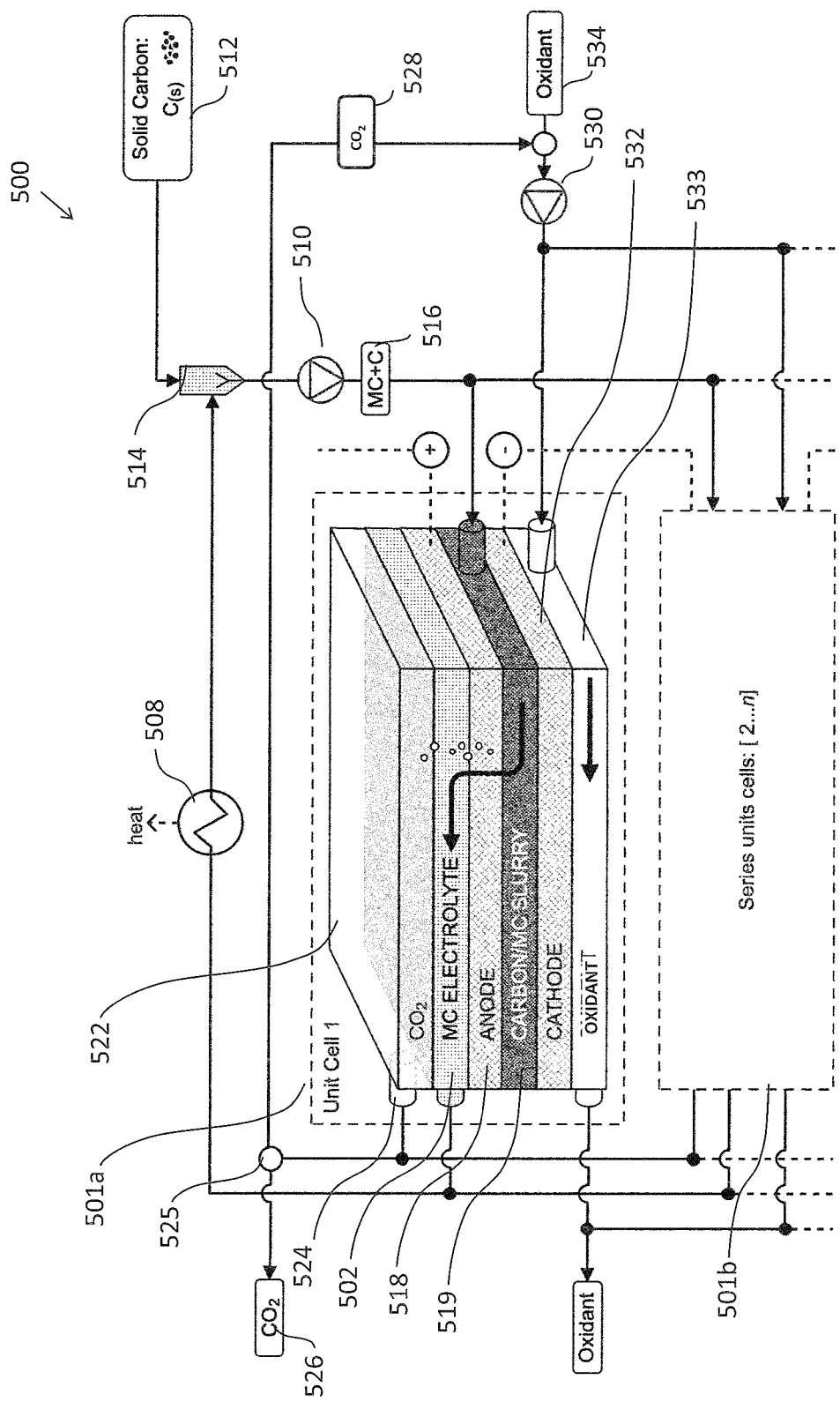
FIG. 5 is a schematic illustration of an embodiment of a molten carbonate direct carbon fuel cell system with molten carbon electrolyte circulation, carbon fuel slurry circulation and a flow-through anode configuration.

FIG. 5 illustrates an embodiment of a MC-DCFC system 500 that is similar to system 400 shown FIG. 4, but where carbon slurry and electrolyte circuits are combined and the system has a flow-through anode configuration, rather than a flow-by anode configuration. FIG. 5 depicts a single unit cell 501a within a DCFC stack comprising a plurality of fuel cells electrically connected in series as indicated at 501b. The reactants and molten electrolyte are again delivered to each cell by way of fluid flow field chambers.

In this configuration solid carbon particles from a fuel supply 512 are introduced into and combined with molten carbon electrolyte in a mixer 514, and the resulting carbon/electrolyte slurry 516 (part molten carbonate electrolyte, part solid carbon fuel) is circulated, in parallel, to flow field chamber 519 located between anode 518 and cathode 532 of the individual DCFCs using circulation pump 510. Flow field chamber 519 is dead-ended such that electrolyte from the slurry is urged or forced to pass through the porous anode 518 into an electrolyte return chamber 502, as indicated by the curved arrow. Carbon from the slurry is trapped and consumed at porous anode 518 by the oxidation reaction at TPB sites. Electrolyte which has passed through the anode (which can, in some cases, be substantially carbon-free) can be cooled by circulating it through heat exchanger 508, have more carbon added at mixer 514 and be recirculated back to flow field chamber 519 of the individual DCFCs.

In system 500, the electrolyte serves as a carbon carrier fluid, and can also be the primary thermal fluid used to extract heat generated during the electrochemical reaction. If the cells are oriented horizontally (as shown in FIG. 5) or otherwise appropriately, evolved $CO_2$ gas may rise into a header area or chamber 522 above electrolyte return chamber 502, and product $CO_2$ gas can be discharged via $CO_2$ exhaust port 524. Alternatively, product $CO_2$ gas can be carried out of the cells with the electrolyte and then be separated externally. The latter approach can eliminate the need for an internal $CO_2$ header, and the cells can be oriented differently, such as vertically.

Product $CO_2$ gas exiting header area or chamber 522 via $CO_2$ exhaust port 524 can be split into two streams at 525, one DCFC exhaust stream 526, and one recirculation stream 528 which is circulated via recirculation compressor 530 to the cathode flow field chamber 533 of each individual DCFC cathode 532, together with an oxidant stream (such as air or pure oxygen) from oxidant supply 534.

Thus, as in system 300 of FIG. 3, in system 500 of FIG. 5 the porous anodes permit the carbon carrier fluid (MC) to pass through the anode, with the anode effectively trapping, or filtering carbon fuel from the slurry. However, unlike in system 300, in system 500 the slurry is also in contact with the cathode. If desired, accumulated fine carbon dust that does pass through the anode can be removed from the electrolyte by a filter or an appropriate maintenance procedure. Introducing fuel into the region between the anode and cathode is unconventional and can generally only be tolerated at low carbon concentrations, otherwise carbon oxidation at the cathode and leakage currents created by the conductive particles can cause problems. Carbon oxidation at the cathode is a chemical reaction which can produce additional heat and reduce the net efficiency of the cell. Carbon in low concentration entrained in the electrolyte flow and directed to the anode will preferentially oxidize in the preferred electrochemical reaction rather than by chemical oxidation with dissolved $O_2$ at the cathode, which is kinetically slower.

FIG. 4 illustrates an embodiment with a flow-by anode configuration, and FIG. 5 illustrates an embodiment of a similar MC-DCFC system but with a flow-through anode configuration. Similar MC-DCFC systems can be configured so that just a portion of the fuel slurry is forced through the anode, so that it is filtered by the anode and some of the carbon carrier fluid (MC) passes through the anode, and the remainder of the fuel slurry flows past the anode in contact with the anode. A flow restriction, such a back pressure device, can be used in the fuel slurry flow circuit to force some of the electrolyte from the slurry to pass through the porous anode into an electrolyte return chamber, while allowing some of the slurry to flow past the anode while still contacting the anode. The flow restriction can be adjustable to allow control of the ratio of flow-by versus flow-through. Such a "hybrid" configuration can offer advantages. For example, having some flow through the anode concentrates or increases the carbon loading in the slurry in the vicinity of the anode, while allowing for the use of a lower carbon loading in the overall bulk fuel slurry that is being circulated. This reduces the viscosity and electrical conductivity of the slurry, which is generally advantageous, and it can also can mean that flow rate of the bulk fuel slurry can be of a sufficient rate to provide adequate heat removal. In operation of some hybrid system embodiments, up to about 5% of the carbon carrier fluid in fuel slurry passes through the anode. In operation of some hybrid system embodiments, up to about 10% of the carbon carrier fluid in fuel slurry passes through the anode. In operation of some hybrid system embodiments, up to about 25% of the carbon carrier fluid in fuel slurry passes through the anode. In operation of some hybrid system embodiments, up to about 50% of the carbon carrier fluid in fuel slurry passes through the anode. In operation of some hybrid system embodiments, up to about 75% of the carbon carrier fluid in fuel slurry passes through the anode.

In the systems illustrated in FIGS. 4 and 5 the fuel cells are shown as having a planar architecture, but the technology described could be readily adapted to be applied to MC-DCFCs with tubular architecture.

Carbon Fuel Slurry Management and Anode Structure

Because the fuel in a DCFC is in the form of a solid particles, rather than a gas or liquid, achieving reaction sites, or triple phase boundary (TPB) sites, at the fuel cell anode is much more challenging. In fact, the contact surface area where carbon is in electrical contact with the electrode and is in simultaneous ionic contact with the electrolyte and carbonate ions is typically very small compared to the surface volume of the fuel itself. Ensuring electrical percolation (i.e. an electrically conductive particle-to-particle path) within the fuel bed, sufficient contact with electrode current collectors and contact with carbonate ions is a considerable and acknowledged challenge in achieving a commercially viable DCFC.

Figure 6:
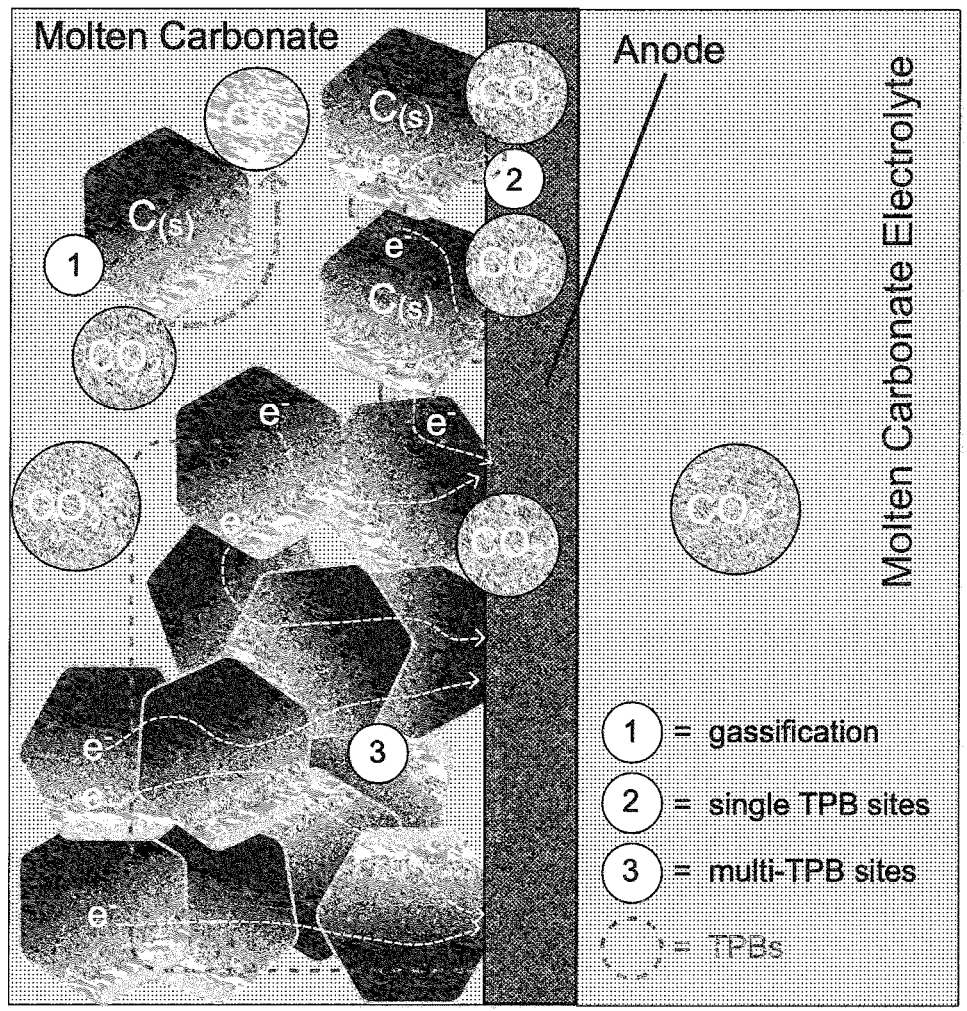
FIG. 6 is a diagram illustrating three phase boundary reaction sites in a direct carbon molten carbonate electrolyte fuel cell.

As shown in FIG. 6, TPBs occur when carbon particles are appropriately wetted with molten carbonate electrolyte and are in contact with an electrical path to complete the electrochemical reaction. In the absence of electrical contact, evolved $CO_2$ can react with carbon to form CO (via the reverse Boudouard reaction) which can negatively impact cell efficiency and can result in dilute emissions of CO in the $CO_2$ product gas. By tailoring the fuel flow path and cell geometry to increase the likelihood of carbon-electrode contact, challenges with establishing TPB sites with a solid fuel can be mitigated.

To facilitate electrolyte wetting and ionic transfer, an ionic carrier fluid (such as molten carbonate) can be used to wet the fuel and enhance ionic conductivity, and the carrier fluid can also be used to "flow" the solid fuel to individual cells as a slurry, as described in reference to the MC-DCFC systems illustrated in FIGS. 3-5 above. While a carbon carrier fluid facilitates delivery of carbon particles to the individual cell electrodes and allows the carbon to be mechanically forced into contact with the electrode, ensuring simultaneous electrical and ionic contact remains a significant challenge in achieving practical performance at an industrial scale. Having carbon suspended or entrained in a molten carrier (such as a eutectic molten carbonate melt) does not guarantee the carbon will make electrical contact with the electrode. Increasing the loading or concentration of carbon in the carrier fluid increases the electrical conductivity of the slurry, and can increase the chances of achieving the necessary electrical contact, but it can also increase the likelihood of leakage currents from cell to cell if the slurry and electrolyte circuits are mixed. It also increases the viscosity of the carbon slurry which can create other associated challenges. For example, in MC-DCFC systems with a common reservoir configuration (such as illustrated in FIGS. 3-5), a high carbon loading can increase the pressure drops in the systems, and the associated pumping loads required to circulate the fluid, due to its higher viscosity.

In MC-DCFC system 300 illustrated in FIG. 3 a carbon/electrolyte slurry is fed to the individual DCFC anodes. The anodes comprise a porous electrode which permits the carbon carrier fluid (MC) to pass through the anode, effectively trapping, or filtering, the carbon fuel from the slurry. This configuration is shown in detail in FIG. 7A, in which the same reference numerals are used to designate the same elements as in FIG. 3. FIG. 7A shows a single DCFC unit cell 701a. The carbon particles, are trapped in the anode chamber and form a packed particle bed which gets forced into the anode by the flow of the MC carrier fluid. This helps mechanically force carbon contact with the electrode, helping to establish TPB sites and promoting conditions for electrochemical oxidation of carbon. The electrical conductivity of the carbon slurry in the anode chamber increases as the carbon:MC ratio increases, helping to extend the electrochemical reaction zone from the surface of the electrode into the slurry. This electrical percolation can help improve reaction mass transport and enable higher current density operation. The MC fuel carrier fluid passing through the porous electrode is depleted or stripped of carbon fuel, and hence it returns to a lower electrical conductivity state which is preferable for the electrolyte function. If the electrolyte were to remain a highly electrically conductive medium in between unit cells, or between anode and cathode, this could lead to short circuits or leakage currents which tend to degrade cell performance. The filtering or concentrating function of the anode therefor serves to provide a more electrically conductive carbon/electrolyte slurry at the anode, and a less electrically conductive (or non-conductive) electrolyte in the electrolyte bath.

As mentioned above, in some embodiments the filtering function of the DCFC anode can be performed by a separate filter element rather than the electrode itself. For example, FIG. 7B, illustrates a DCFC unit cell 701b which is a variant on the unit cell of FIG. 7A, and which can be used in a MC-DCFC system such as system 300 of FIG. 3. In FIG. 7B the same reference numerals are used to designate the same elements as in FIG. 3. In DCFC 701b, instead of filtering the carbon/electrolyte slurry through the porous anode itself, a flow restriction, element 750, such as a porous membrane or filter, can be used to provide filtering of the slurry and carbon particle packing at the anode. This approach has a benefit that the flow restriction element can be designed (and the material selected) to be suitable for the primary or sole purpose of providing backpressure and filtering, without also having to perform an electrochemical function. This may enable the flow restriction element to be sized for the pressure condition, flow rate and desired filtering porosity, and the anode material to be selected for its electrochemical performance and other desirable characteristics.

Along with the tailoring of fuel flow paths to help deliver carbon to the anode, carbon particle morphology also affects the ease with which TPB sites are established. If carbon particle size and shape are not appropriately matched with the topology of the porous electrode, TPB sites may be limited. Even if the dimensions of the carbon particles and pores are initially matched, as carbon is consumed at the electrode the morphology and size of the carbon particles changes (e.g. particle size decreases as carbon is consumed). As this occurs, the smaller particles may simply pass through the porous electrode without establishing electrochemical contact. To mitigate this issue, in the context of a flow of carbon particles in a molten carbonate slurry, an electrode with a graded pore structure (e.g. having decreasing pore dimensions through the thickness of the material) can be used, so that smaller particles are still trapped by the electrode, even as carbon is consumed.

Figure 8:
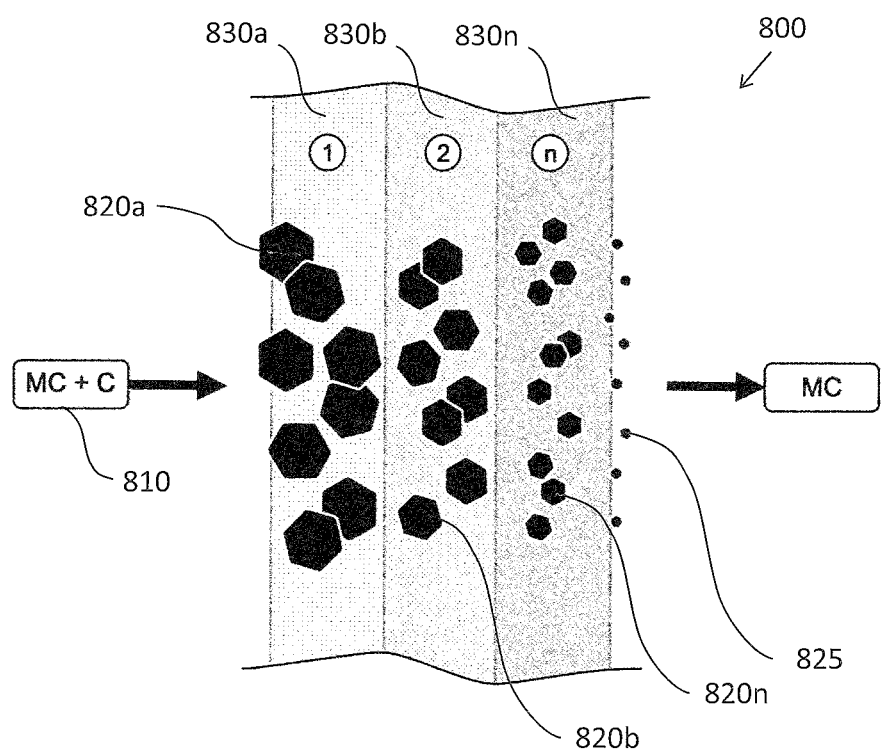
FIG. 8 illustrates an embodiment of a multi-layer anode composite anode, with each discrete layer having a different pore size.

There can be a gradual change in pore structure through the thickness of the anode, or there can be step-wise changes in pore structure through the thickness of the anode, for example, as in a multi-layer anode such as illustrated in FIG. 8.

FIG. 8 shows how a multi-layer anode composite anode 800, with each discrete layer having a different pore size, pore density and/or porosity (with increasing resistance to flow in the flow direction), can enhance the establishment of carbon reaction sites (as TBPs). As a carbon slurry 810 penetrates anode 800, carbon particles 820*a* are trapped in a first porous anode layer 830*a*, and can be partially consumed by the electrochemical reaction in layer 830*a* before being dislodged and flowing into a second anode layer 830*b* having a smaller pore size than the first anode layer 830*a*. Smaller carbon particles 820*b* are trapped and can be partially consumed by the electrochemical reaction in layer 830*b* before being dislodged and flowing into a one or more subsequent anode layers, designated as 830*n*, having sequentially smaller pores, where smaller carbon particles 820*n* wetted with electrolyte contact the electrode to establish further TPB reaction sites. This process continues until fine carbon residuals 825 pass through multi-layer anode 800 to be recirculated in the molten electrolyte. An anode with graded porosity can be created by creating a composite multi-layer anode of discrete layers with unique pore sizes as shown in FIG. 8, or can be created as a monolithic structure using manufacturing processes which create a variable pore size through the thickness of the anode material.

These multi-layer or graded electrode structures can be applied in flow-through anode configurations (such as illustrated in FIGS. 3 and 5), and in flow-by anode configurations (such as illustrated in FIG. 4). In a flow-by configuration, particles are drawn into the anode by the flow pressure, and particles of different sizes create TPB sites as they are filtered through the graded porosity of the anode.

Figure 9:
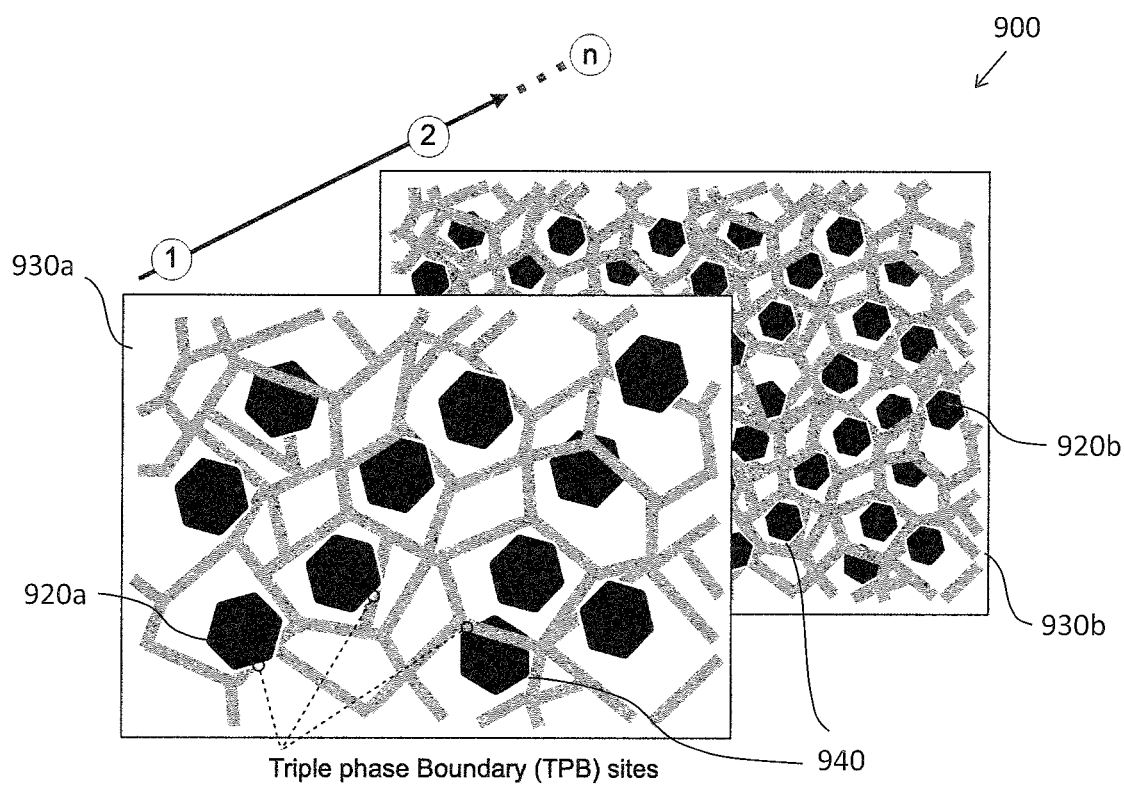
FIG. 9 is an exploded schematic illustration of two layers of a multi-layer anode.
Figure 10:
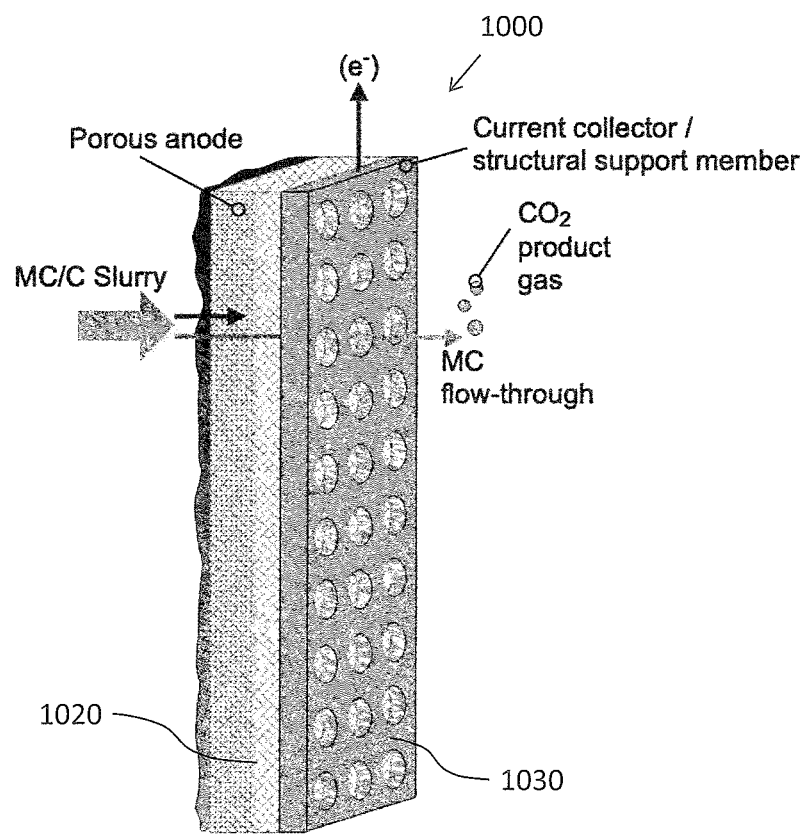
FIG. 10 is an isometric schematic illustration of an embodiment of a multi-layer anode comprising a porous electrode layer and a structural support layer.

FIG. 9 shows a different (exploded) view of the first two layers of a multi-layer anode 900 (similar to anode 800 of FIG. 8). TPB sites 940 are created in the first porous layer 930*a* as carbon particles 920*a* with a pore size larger than the pore size in layer 930*a* become trapped and cannot pass through. As carbon gets consumed in the electrochemical oxidation reaction in layer 930*a*, the carbon particles get smaller and may dislodge and continue to flow to a second anode layer 930*b* having finer pores which traps these smaller carbon particles 920*b*, again forming TPB sites where reaction can occur, and so on Whether planar or tubular, the anode is typically a thin structure (0.5 to 5 mm thick for example), and may need structural support to withstand the cross-pressures associated with either a flow-through or flow-by configuration. FIG. 10, shows a composite multi-layer planar anode 1000 that comprises a porous electrode layer 1020, and a structural support layer 1030 which can be electrically conductive and further serve as an anode current collector. The structural support layer 1030 may also be porous or perforated to allow for the flow of electrolyte through the thickness of the anode, for example, in flow-through configurations. In some embodiments, a bipolar plate can serve as a structural support layer for the anode, as well as optionally serving as a current collector and/or a flow field plate (e.g. with channels or grooves formed therein). In some embodiments a structural support member is incorporated within the porous anode (e.g. as an internal layer), instead of or as well as on one or both major surfaces. In some embodiments the structural support it made from the same material as the anode, only with a different structure (e.g. different porosity). In some embodiments the structural support member comprises support rods (inside or out), or another structure, rather than a plate or layer.

Management of $CO_2$ Product Gas in a DCFC

In this section, some example embodiments of MC-DCFC systems that are similar to those described above, and some variations thereon, are described and discussed, in particular reference to the management of product $CO_2$ gas and the flow of electrolyte.

As carbon is oxidized and product $CO_2$ gas is evolved, it can create bubbles at the anode (e.g. at the TPB sites) or disperse back into the carbon slurry that is being fed to the anode. The presence and evolution of $CO_2$ bubbles at the TPB sites can prevent oxygen ions from contacting the carbon and anode electrode, resulting in local reactant starvation and reduced cell voltage and efficiency. Thus, it is generally desirable to limit or avoid the bubbling $CO_2$ product gas into the electrolyte interface between cathode and anode. Product $CO_2$ gas can also react with carbon at elevated temperatures to form CO, which is generally undesirable as a constituent of the product gas. It is therefore also desirable to limit or avoid significant $CO_2$/carbon residence time during which gasification to form CO can occur via the reverse Boudouard reaction. Efficient removal of $CO_2$ product gas from the reaction sites along a preferred course can help mitigate these unwanted issues, and promote the desired electrochemical reactions.

Figure 11:
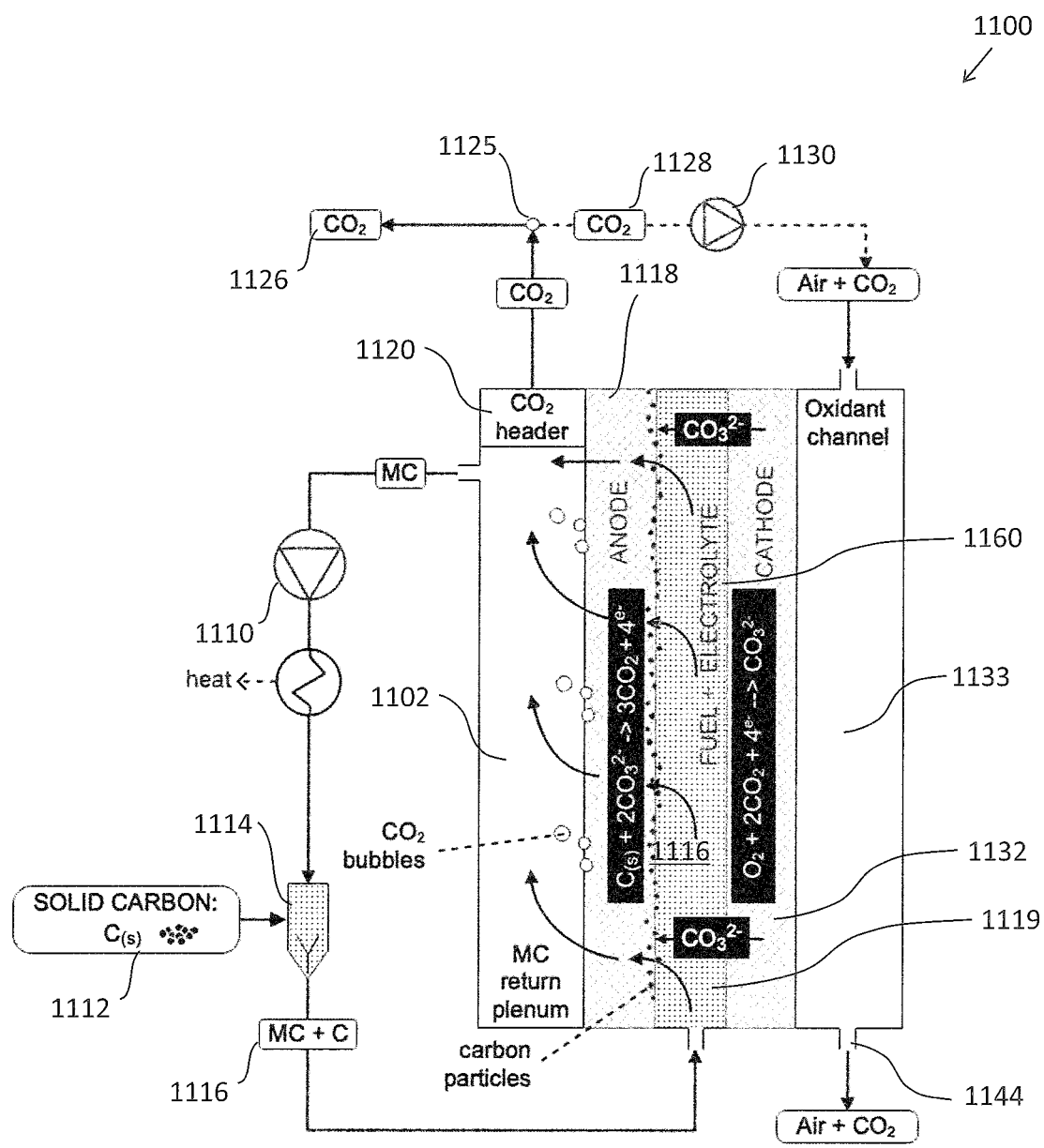
FIG. 11 is a schematic illustration of an embodiment of a molten carbonate direct carbon fuel cell system with molten carbon electrolyte circulation, carbon fuel slurry circulation and a flow-through anode configuration.

FIG. 11 is a schematic illustration of a MC-DCFC system 1100 that is similar to system 500 illustrated in FIG. 5, where carbon slurry and electrolyte circuits are combined and the carbon slurry is introduced into the region between the anode and cathode. System 1100 is illustrated for a single cell, but it is understood that it could be a system comprising multiple DCFCs electrically connected in series and fed with the various process streams in parallel. In system 1100, solid carbon particles from a fuel supply 1112 are introduced into and combined with molten carbon electrolyte in a mixer 1114, and the resulting carbon/electrolyte slurry 1116 is delivered to a flow field chamber 1119 between the anode 1118 and cathode 1132 using circulation pump 1110. Flow field chamber 1119 is dead-ended such that electrolyte from the fuel slurry is urged or forced to pass through the porous anode 1118 into an electrolyte return chamber 1102. Carbon from the slurry is trapped and consumed at the porous anode 1118. Electrolyte which has passed through the anode can optionally be cooled in a heat exchanger (not shown in FIG. 11), have more carbon added at mixer 1114, and be recirculated back to flow field chamber 1119.

The flow path in system 1100 encourages $CO_2$, produced as a by-product of the carbon oxidation reaction at the anode, to cross through porous anode 1118, instead of bubbling up though the carbon slurry in chamber 1119. This directional entrainment can serve various purposes. For example, it may reduce or eliminate the presence of $CO_2$ gas bubbles in the electrolyte that is between the anode and cathode, which can otherwise cause local ion starvation and voltage instability, and it may help ensure that product $CO_2$ gas does not percolate through the carbon fuel bed where carbon gasification could otherwise occur by the reverse Boudouard reaction. Product $CO_2$ gas may rise into a header area 1120 in electrolyte return chamber 1102 and then be discharged from the fuel cell. A portion of the $CO_2$ can then be circulated to the cathode for the cathode carbonate formation reaction. In system 1100 product $CO_2$ gas is split into two streams at 1125, one DCFC exhaust stream 1126, and one recirculation stream 1128 which is circulated via recirculation compressor 1130 to the cathode flow field chamber 1133, together with an oxidant stream (such as air or pure oxygen). Unreacted $CO_2$ gas can be discharged from cathode flow field chamber 1133 at exhaust port 1144.

FIG. 11 also shows an optional cathode protection barrier 1160 that can be used to shield the cathode from carbon particles in the fuel slurry, to mitigate potential oxidation of carbon particles at the cathode, which could otherwise lead to increased heat generation and reduced cell efficiency. Cathode protection barrier 1160 can serve as a local insulator to reduce or prevent solid carbon particles entrained in the carbon/electrolyte slurry in chamber 1119 from coming into electrical contact with the cathode. Such a protection barrier can be incorporated into any of the embodiments described herein where the carbon/electrolyte slurry if supplied to a region or chamber located between the anode and cathode. An example embodiment of such cathode protection barrier is described in further detail below in reference to FIG. 14.

Figure 12:
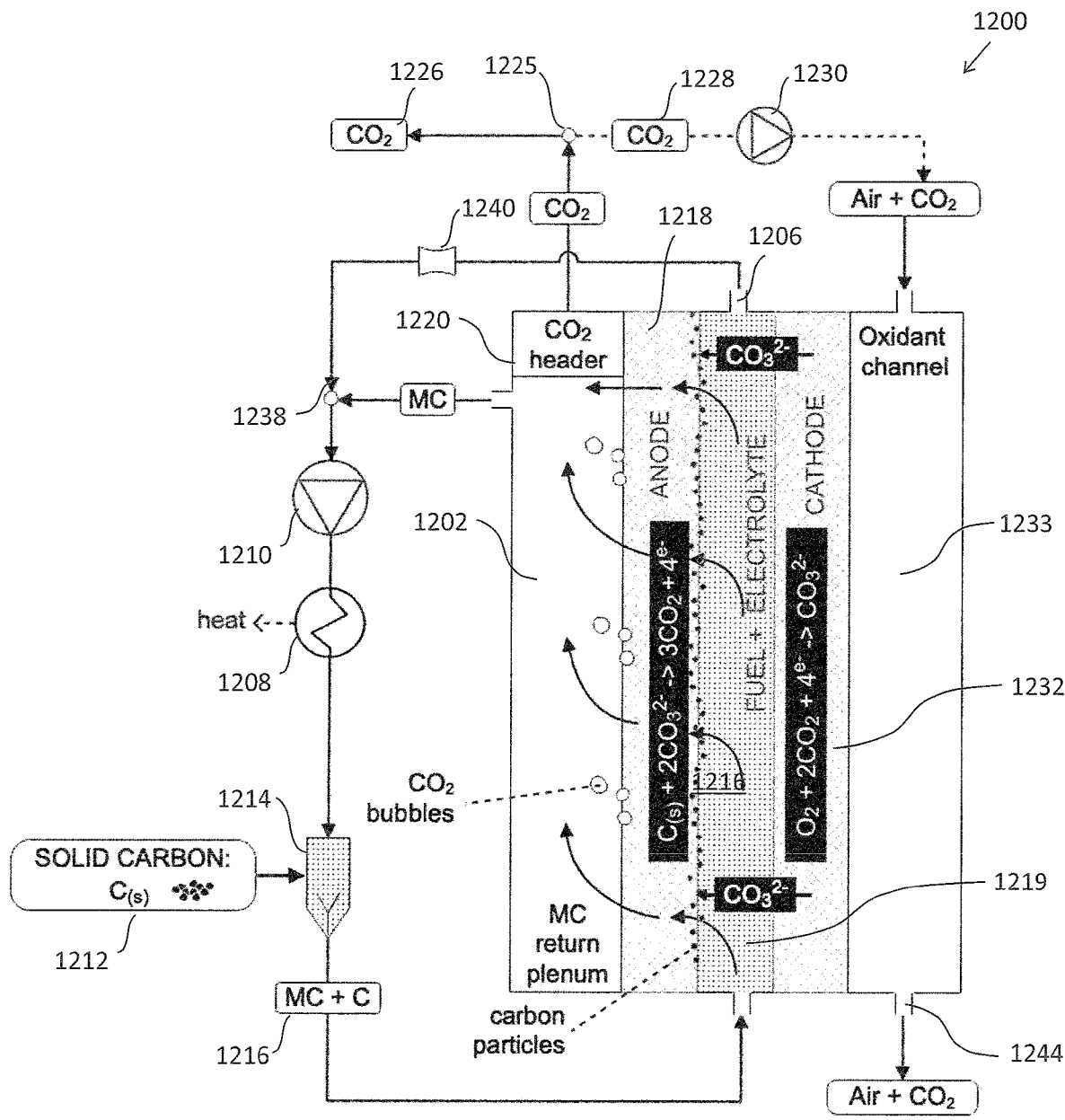
FIG. 12 is a schematic illustration of an embodiment of a molten carbonate direct carbon fuel cell system with molten carbon electrolyte circulation, carbon fuel slurry circulation and partial flow-through, partial flow-by anode configuration.

FIG. 12 is a schematic illustration of a MC-DCFC system 1200 that is similar to system 1100 illustrated in FIG. 11, except that not all of the electrolyte from the carbon/electrolyte slurry is circulated through the thickness of porous anode. System 1200 has a hybrid flow-through/flow-by anode configuration. System 1200 is illustrated for a single cell, but again it is understood that it could be a system comprising multiple DCFCs electrically connected in series and fed with the various process streams in parallel. In system 1200, solid carbon particles from a fuel supply 1212 are introduced into and combined with molten carbon electrolyte in a mixer 1214, and the resulting carbon/electrolyte slurry 1216 is circulated to flow field chamber 1219 between the anode 1218 and cathode 1232 using circulation pump 1210. The slurry passes through chamber 1219 in contact with porous anode 1218. Some of the slurry permeates the anode, and carbon from the slurry is trapped and consumed at the anode. Electrolyte that passes through anode 1218 enters electrolyte return chamber 1202. The remainder of the electrolyte slurry, with a depleted carbon loading, exits flow field chamber 1219 at outlet 1206 and is combined with electrolyte from return chamber 1202 at 1238. The combined electrolyte stream can be cooled in a heat exchanger 1208, have more carbon added at mixer 1214, and be recirculated back to flow field chamber 1219.

Figure 13:
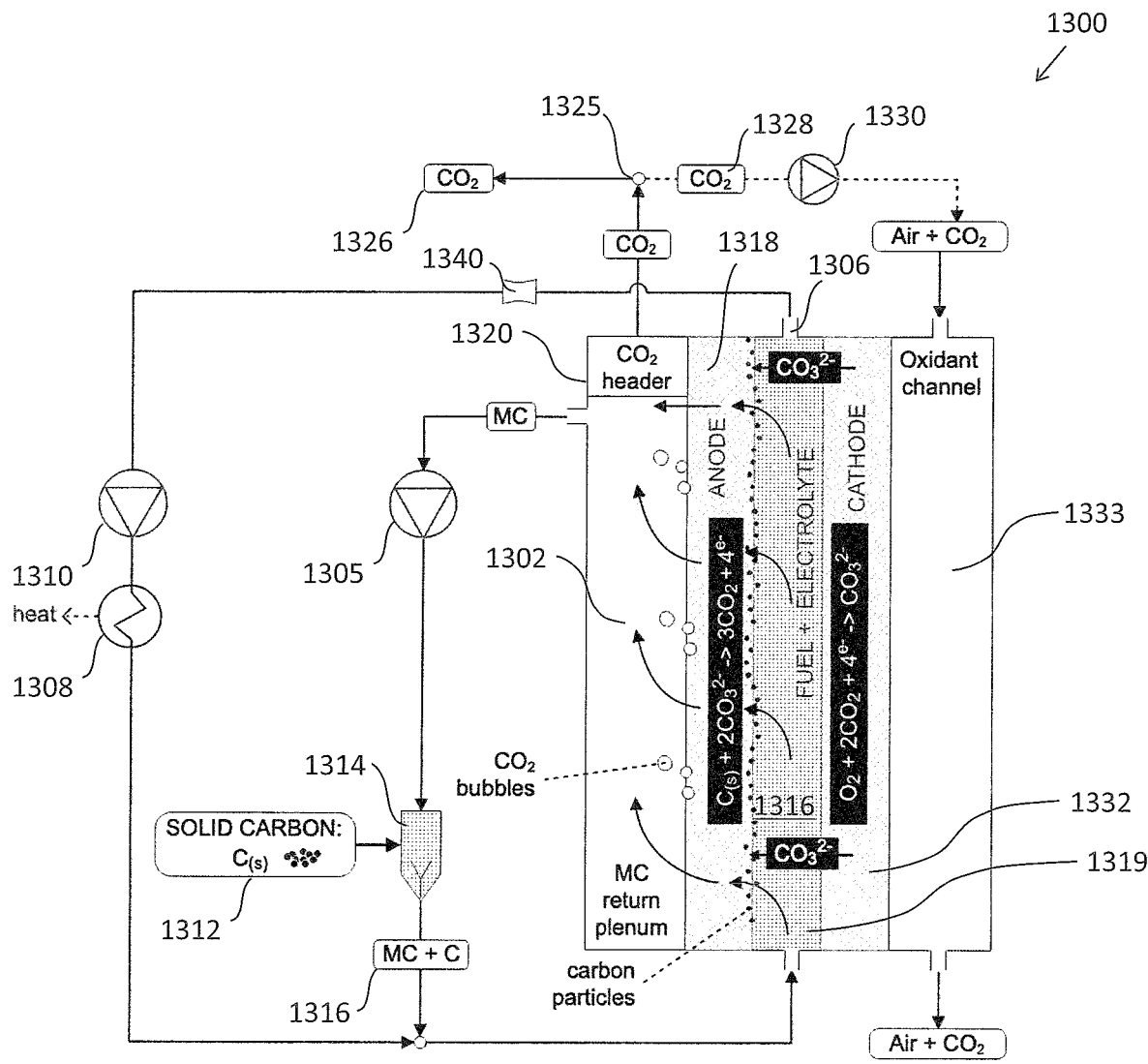
FIG. 13 is a schematic illustration of an embodiment of a molten carbonate direct carbon fuel cell system with molten carbon electrolyte circulation, carbon fuel slurry circulation and partial flow-through, partial flow-by anode configuration.

The ratio of flow of electrolyte (slurry) through outlet 1206 versus through anode 1218 and into electrolyte return chamber 1202 can be controlled to some degree by the anode porosity. A flow restriction 1240 can also be positioned in the main electrolyte loop, for example, to ensure that there is sufficient pressure drop across the anode to force carbon particles to TPB sites and to flush product $CO_2$ into the (substantially) carbon-free electrolyte slipstream in return chamber 1202. Flow restriction 1240 may be a passive orifice restriction, an active back-pressure regulator or similar or other suitable device. In other embodiments, the ratio of flow of electrolyte (slurry) through outlet 1206 versus through anode 1218 and into electrolyte return chamber 1202 can be further controlled by having two independent pumps and flow paths, for example, as shown in FIG. 13.

To some extent, the configuration of system 1200 enables decoupling of two electrolyte flow stream functions: (1) the "slipstream" delivery of carbon particles to the anode with (2) the entrainment of product $CO_2$ gas away from the carbon bed and the bulk flow of electrolyte as a heat exchange medium. In the illustrated embodiment, the electrolyte from return chamber 1202 and the bulk electrolyte (depleted slurry) flow from flow field chamber 1219 are re-combined upstream of heat exchanger 1208. It can be appreciated that these streams can be combined downstream of the heat exchanger, kept independent or otherwise configured to accomplish the desired goals for each stream.

The product $CO_2$ gas may rise into a header area 1220 electrolyte return chamber 1202 and discharged from the fuel cell. A portion of the $CO_2$ can then be circulated to the cathode for the cathode carbonate formation reaction. In system 1200 product $CO_2$ gas is split into two streams at 1225, one DCFC exhaust stream 1226, and one recirculation stream 1228 which is circulated via recirculation compressor 1230 to the cathode flow field chamber 1233, together with an oxidant stream (such as air or pure oxygen). Unreacted $CO_2$ gas can be discharged from cathode flow field chamber 1233 at exhaust port 1244.

In a similar embodiment, the flow ratio between a through-anode electrolyte flow and a bulk electrolyte cooling medium flow can be accomplished by having independent pumps controlling the flows in each path. For example, FIG. 13 is a schematic illustration of a MC-DCFC system 1300 that is similar to system 1200 illustrated in FIG. 12, and again has a hybrid flow-through/flow-by anode configuration. System 1300 is illustrated for a single cell, but again it is understood that it could be a system comprising multiple DCFCs electrically connected in series and fed with the various process streams in parallel. In system 1300, solid carbon particles from a fuel supply 1312 are introduced into and combined with molten carbon electrolyte in a mixer 1314, and the resulting carbon/electrolyte slurry 1316 is circulated to a flow field chamber 1319 between the anode 1318 and cathode 1332 by a first circulation pump 1305. Again some of the slurry permeates the anode, and carbon from the slurry is trapped and consumed at the anode. Electrolyte that passes through anode 1318 enters electrolyte return chamber 1302, has more carbon added at mixer 1314, and is recirculated back to flow field chamber 1319 by first circulation pump 1305. The remainder of the electrolyte slurry, with a depleted carbon loading, exits flow field chamber 1319 at outlet 1306 and is circulated through heat exchanger 1308 by a second circulation pump 1310. It is then combined with slurry from mixer 1314 and recirculated back to flow field chamber 1319.

First recirculation pump 1305 can be used to appropriately regulate the flow and pressure drop across the anode to ensure appropriate carbon accumulation and $CO_2$ product gas management. The flow rate of second recirculation pump 1310 can be set to provide the desired heat extraction in heat exchanger 1308, for example, to maintain a preferred stack temperature and/or temperature rise across the fuel cell or stack(s). This type of configuration can be used to introduce an additional degree of control freedom at the cost of additional balance of plant equipment. An optional flow restriction 1340 can also be positioned in the main electrolyte loop to provide further control of flow of electrolyte (slurry) through outlet 1306 versus through anode 1318 and into electrolyte return chamber 1302.

Figure 14:
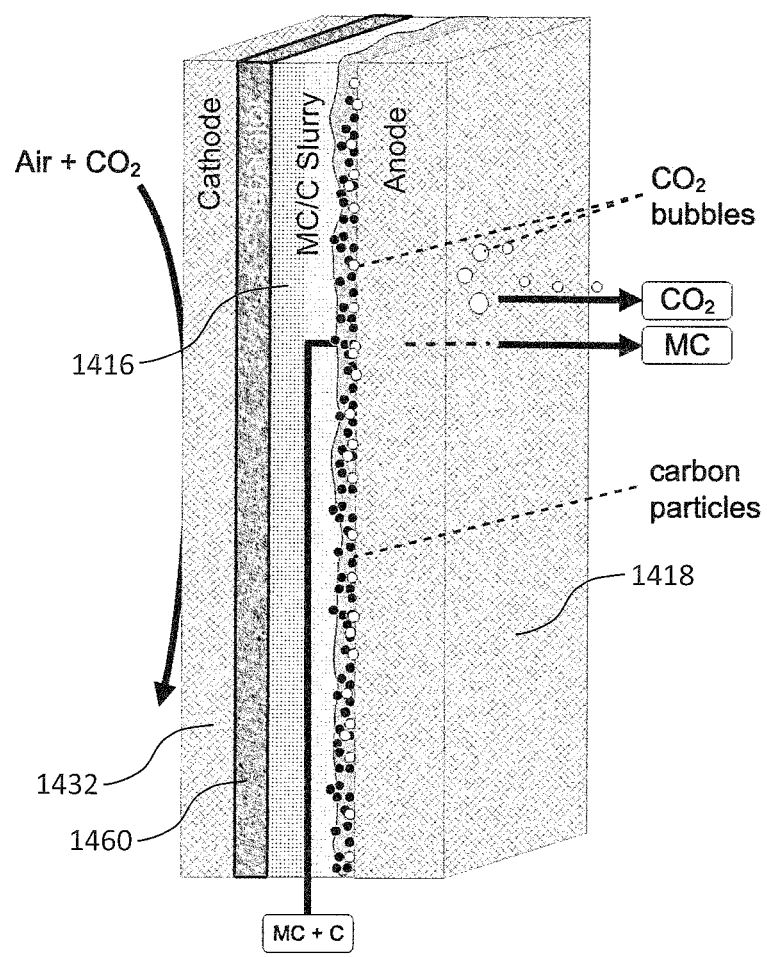
FIG. 14 is a schematic illustration of an embodiment of a direct carbon fuel cell with a cathode protection barrier.

As mentioned in reference to FIG. 11 above, a cathode protection barrier can be used in any of the various MC-DCFC systems described herein, which have carbon slurry between the anode and cathode, to mitigate potential oxidation of carbon particles at the cathode, which could otherwise lead to increased heat generation and reduced cell efficiency. FIG. 14 illustrates an example of such a cathode protection barrier 1460 positioned between cathode 1418 and a molten carbonate slurry 1416 flowing in a flow field chamber between anode 1418 and cathode 1432. Cathode protection barrier 1460 can serve as a local insulator or shield to reduce or prevent solid carbon particles entrained in the carbon/electrolyte slurry from coming into electrical contact with the cathode. The protective barrier can be, for example, a micro surface coating or a physical separator such as a porous felt which maintains a certain separation or distance between the carbon in the carbon/electrolyte slurry and the cathode.

CO₂ Transport to the Cathode Via the Electrolyte

In typical MC-DCFCs, $CO_2$ is mixed with air and delivered to the cathode to complete the cathode carbonate formation reaction, as in equation (1) above. As in the various MC-DCFC systems described above, a portion of the product $CO_2$ produced at the anode can be separated and directed to the cathode to replenish the consumed carbonate ions and continue the overall reaction. On a stoichiometric basis, the cathode will consume ⅔ of the $CO_2$ produced at the anode. Excess $CO_2$ can be added or recirculated from the anode to maintain a desired $CO_2$ concentration across the entire cathode reaction area (i.e. stoichiometric quantities >1). If excess $CO_2$ is supplied to the cathode, unreacted $CO_2$ mixed with the oxygen depleted air is exhausted from the cell resulting in greenhouse gas (GHG) emissions. Eliminating these emissions generally requires expensive $CO_2$ separation equipment.

In another aspect of the technology described herein, instead of employing external $CO_2$ recirculation (from anode to cathode) and the resulting potential for dilute $CO_2$ cathode exhaust emissions, $CO_2$ may instead be transferred from anode to cathode internally via the molten carbonate electrolyte.

Figure 15:
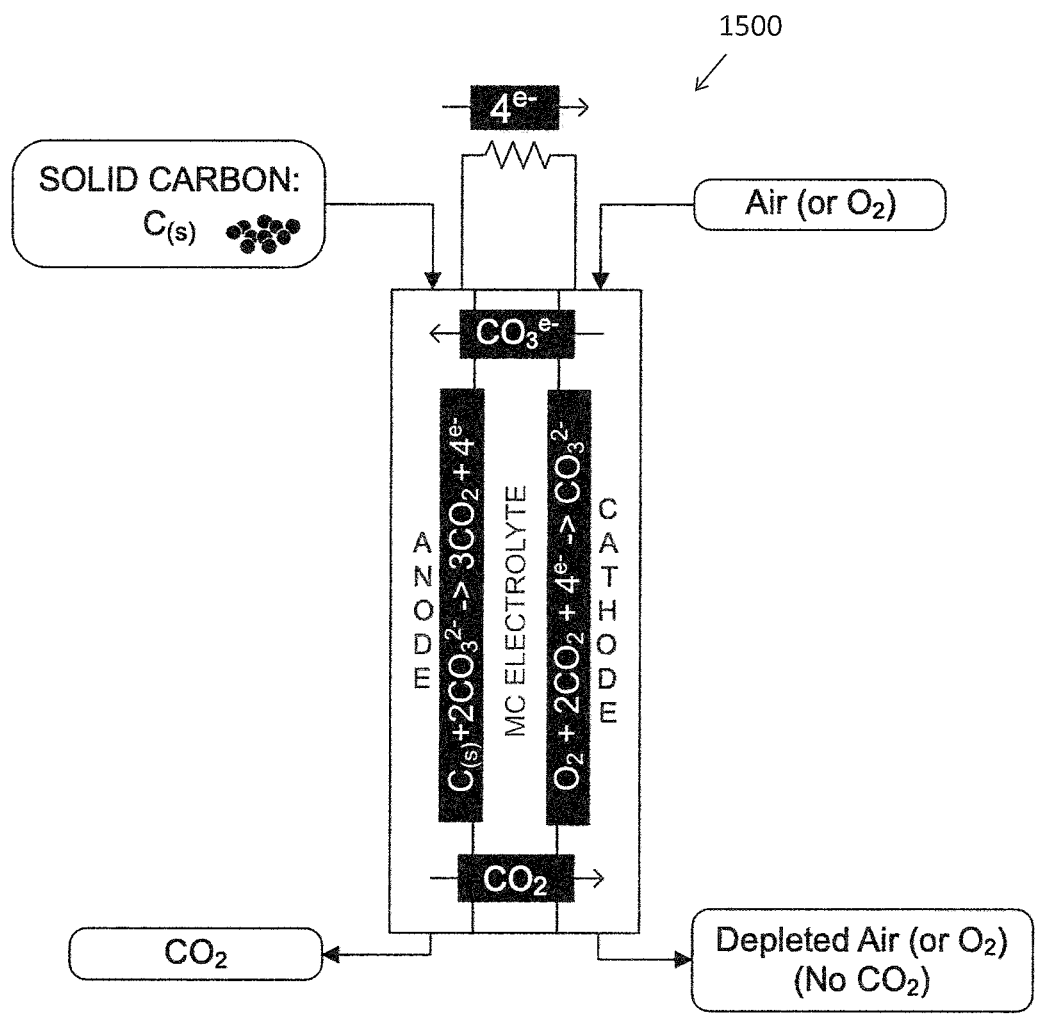
FIG. 15 is a schematic illustration of an embodiment of a molten carbonate direct carbon fuel cell in which carbon dioxide formed at the anode passes to the cathode via the molten carbonate electrolyte.

In the MC-DCFC system 1500 illustrated schematically in FIG. 15, a portion of the product $CO_2$ formed via the anode carbon oxidation reaction passes through the porous anode and diffuses into the molten carbonate electrolyte. The dissolved $CO_2$ migrates by diffusion to the cathode where it combines with oxygen ions to undergo the cathode reaction, forming carbonate ions ($CO_3^{2-}$). The carbonate ions are then conducted back across the electrolyte to the anode where they oxidize the solid carbon, forming $CO_2$. Product $CO_2$ not carried across to the cathode in molten carbonate electrolyte is exhausted from the anode and can be collected and used in other processes. Operation in this way does not require $CO_2$ to be delivered to the cathode with the gaseous oxidant stream, and therefore such a system can be operated without discharge of dilute $CO_2$ from the cathode.

Figure 16:
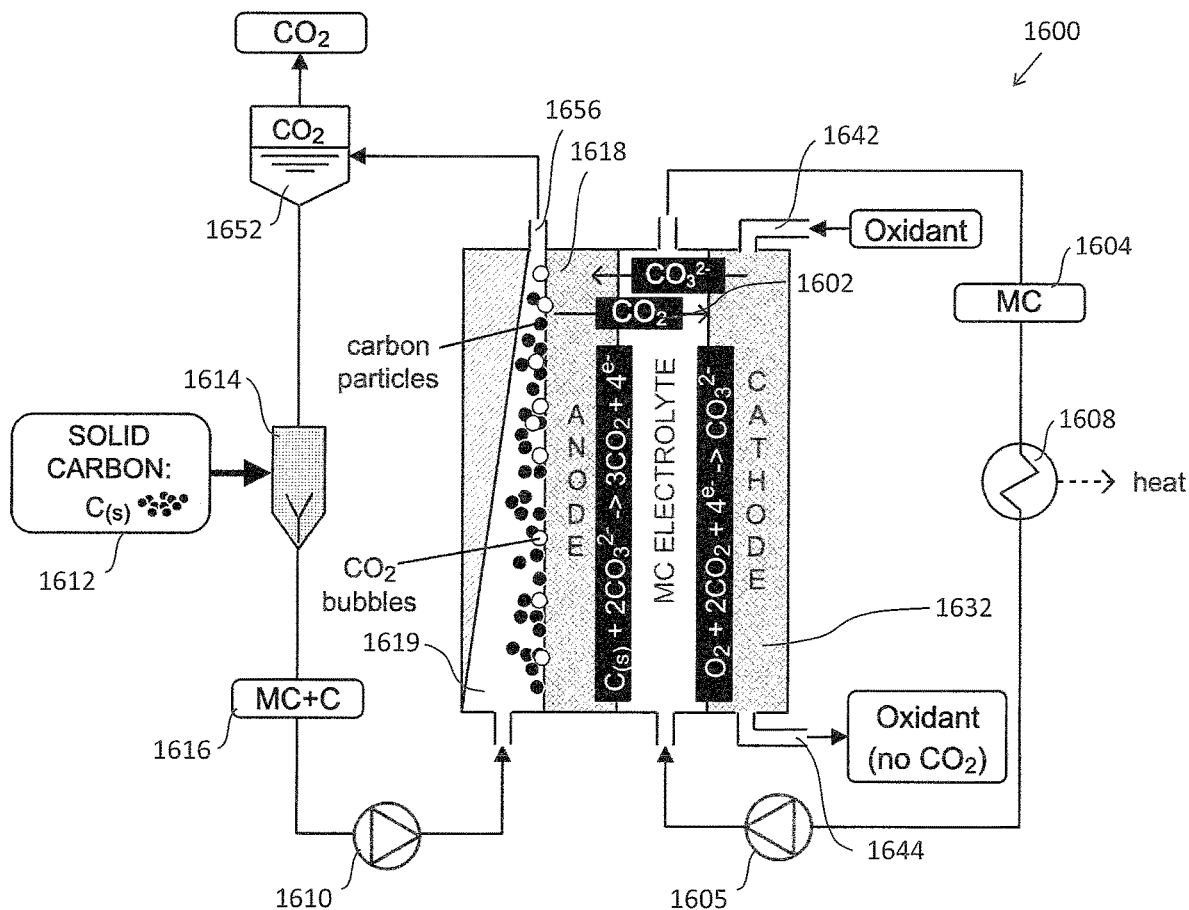
FIG. 16 is a schematic illustration of an embodiment of a molten carbonate direct carbon fuel cell system, with a flow-by anode configuration, in which carbon dioxide formed at the anode passes to the cathode via the molten carbonate electrolyte.

FIG. 16 shows a similar embodiment in more detail. System 1600 is illustrated for a single cell, but again it is understood that it could be a system comprising multiple DCFCs electrically connected in series and fed with the various process streams in parallel. In system 1600, on the anode side, solid carbon particles from a fuel supply 1612 are introduced into and combined with molten carbon electrolyte (as carbon carrier fluid) in a mixer 1614, and the resulting carbon/electrolyte slurry 1616 is circulated to anode flow field chamber 1619 using circulation pump 1610 in a flow-by anode configuration. The slurry passes through flow field chamber 1619 in contact with porous anode 1618. Carbon from the slurry is trapped and consumed at the anode. In this embodiment, $CO_2$ produced from the oxidation of solid carbon particles diffuses in dissolved form from the porous anode 1618 through the electrolyte in chamber 1602 to the cathode 1632 to combine with an oxidant to form carbonate ions. An oxidant, such as oxygen or air, is delivered to and exhausted from cathode 1632 via oxidant inlet 1642 and oxidant outlet 1644. The remaining product $CO_2$ is discharged from the cell along with the depleted slurry at outlet 1656, and is separated from the depleted slurry at separator 1652 before being collected for subsequent sequestration or use in other commercial processes. Additional carbon fuel is then added to the depleted slurry at mixer 1614 and the slurry is circulated to flow field chamber 1619. Electrolyte 1604 is circulated through chamber 1602 between the anode and cathode), and heat exchanger 1608 using a second circulation pump 1605. Dissolved $CO_2$ and carbonate ions are still free to migrate across the electrolyte from anode to cathode and vice-versa even as the liquid electrolyte is circulated. Since no $CO_2$ is required in the oxidant stream at the cathode, the cathode exhaust discharged at outlet 1644 is substantially free of $CO_2$.

Figure 17:
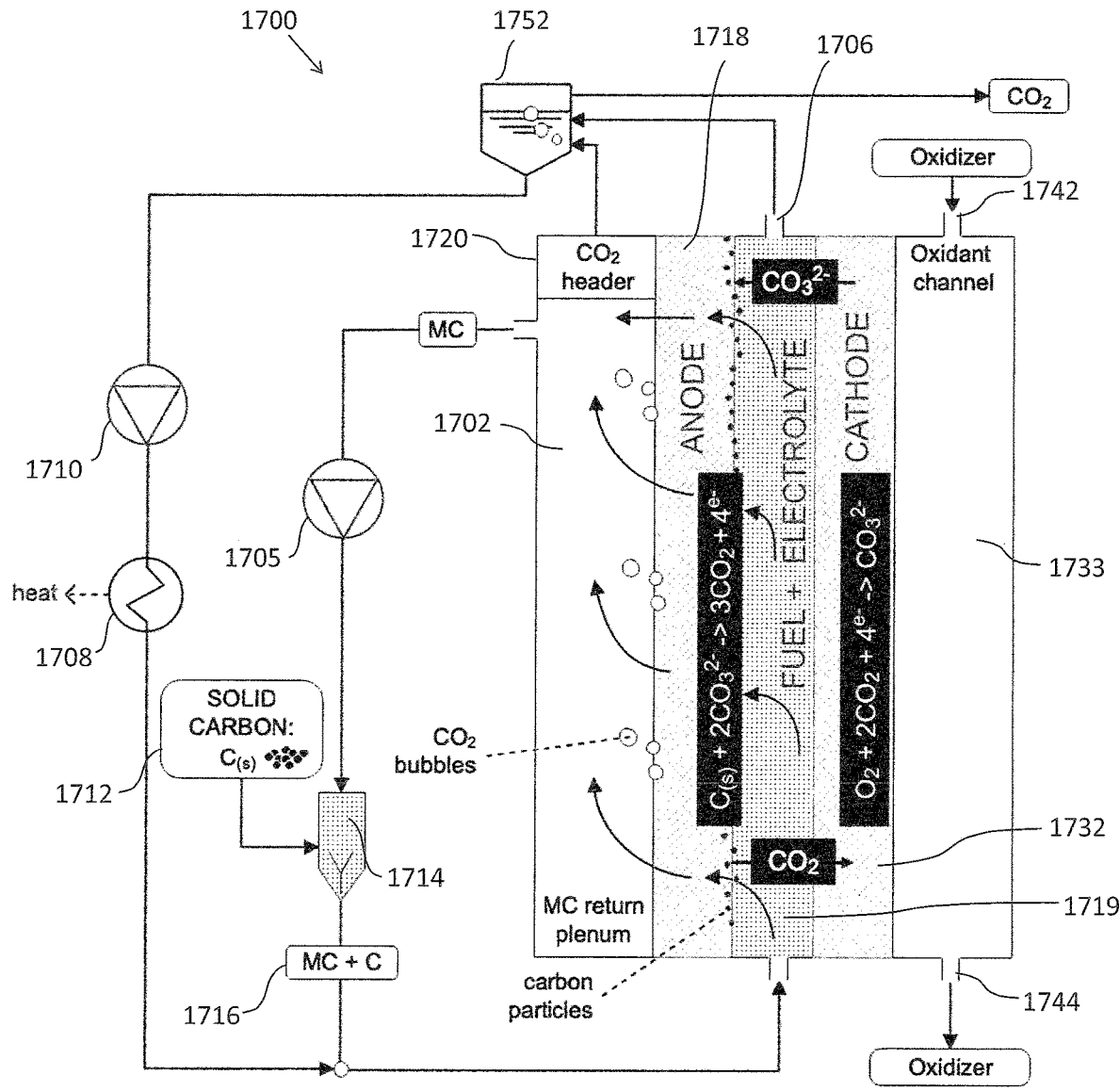
FIG. 17 is a schematic illustration of an embodiment of a molten carbonate direct carbon fuel cell system, with a partial flow-through, partial flow-by anode configuration, in which carbon dioxide formed at the anode passes to the cathode via the molten carbonate electrolyte.

A further embodiment is illustrated schematically in FIG. 17. This MC-DCFC system 1700 is similar to system 1300 illustrated in FIG. 13, but without external circulation of product $CO_2$ to the cathode. System 1700 has a hybrid flow-through/flow-by anode configuration. System 1700 is illustrated for a single cell, but again it is understood that it could be a system comprising multiple DCFCs electrically connected in series and fed with the various process streams in parallel. In system 1700, solid carbon particles from a fuel supply 1712 are introduced into and combined with molten carbon electrolyte in a mixer 1714, and the resulting carbon/electrolyte slurry 1716 is circulated to an electrolyte flow field chamber 1719 between the anode 1718 and cathode 1732 by a first circulation pump 1705. Some of the slurry permeates the anode, and carbon from the slurry is trapped and consumed at the anode. Electrolyte that passes through anode 1718 enters electrolyte return chamber 1702, has more carbon added at mixer 1714, and is recirculated back to flow field chamber 1719 by first circulation pump 1705. The remainder of the electrolyte slurry, with a depleted carbon loading, exits flow field chamber 1719 at outlet 1706 and is circulated through heat exchanger 1708 by a second circulation pump 1710. It is then combined with slurry from mixer 1714 and recirculated back to flow field chamber 1719.

First recirculation pump 1705 can be used to appropriately regulate the flow and pressure drop across the anode to ensure appropriate carbon accumulation and $CO_2$ product gas management. The flow rate of second recirculation pump 1710 can be set to provide the desired heat extraction in heat exchanger 1708, for example, to maintain a preferred stack temperature and/or temperature rise across the fuel cell or stack(s).

Product $CO_2$ is drawn from header space 1720 and some of it is dissolved in the carbon-depleted molten carbonate electrolyte in entrainment vessel 1752. The remainder is exhausted for subsequent sequestration or export to commercial markets. The dissolved $CO_2$ migrates to cathode 1732 via the circulating carbon/electrolyte slurry in chamber 1702 to combine with an oxidant to form carbonate ions which are conducted back to the anode. This embodiment enables dissolved $CO_2$ to become entrained in the electrolyte and carried to the cathode in the electrolyte while having a hybrid flow-through/flow-by anode configuration.

It should be evident that the embodiments described herein could be configured in a number of different ways to accomplish the same objectives. For example, system 1700 could be configured such that sufficient product $CO_2$ is entrained in the carbon fuel carrier in the anode molten carbonate return chamber, and then transferred to the electrolyte through mixing. Also, for example, system embodiments such as shown in FIGS. 11, 12 and 13 can be modified so that there is no external circulation of gaseous $CO_2$ to the cathode, but so that $CO_2$ is entrained in the electrolyte and delivered to the cathode via the bulk electrolyte flow. As in FIG. 17. Again, $CO_2$ can be entrained in the carbon fuel carrier in the anode molten carbonate return chamber, with the optional use of an entrainment vessel to provide additional entrainment of product $CO_2$ into the electrolyte.

Liquid Cathodes for DCFCs

Delivering reactants to the anodes and cathodes of unit cells within a larger MC-DCFC stack or system requires fluid interfaces to the relevant flow fields. This is a common challenge for fuel cell stacks and requires the use of appropriate piping, manifolding and port connections to ensure the appropriate streams and reactants are directed to the correct places. Adequate sealing must be provided to ensure certain streams do not leak or mix. In the case of a MC-DCFC, the challenge of sealing and interfacing is further complicated by high temperatures, different thermal expansion characteristics of component materials and a corrosive environment.

The MC-DCFC cathode reactant stream is typically a gas (air or $O_2$, generally with added $CO_2$) and the anode reactant stream is a liquid MC fuel slurry in the systems described herein. If the electrolyte is configured as a common fluid as described herein (rather than a captive electrolyte in a matrix—as is conventional), then the electrolyte flow stream is also fluid. Maintaining seals between the various gas and liquid flow field interfaces can be challenging. If all streams were liquid, minor cross-overs of fluid would be generally be less problematic, reducing the burden on sealing and simplifying porting and manifolding.

Figure 18:
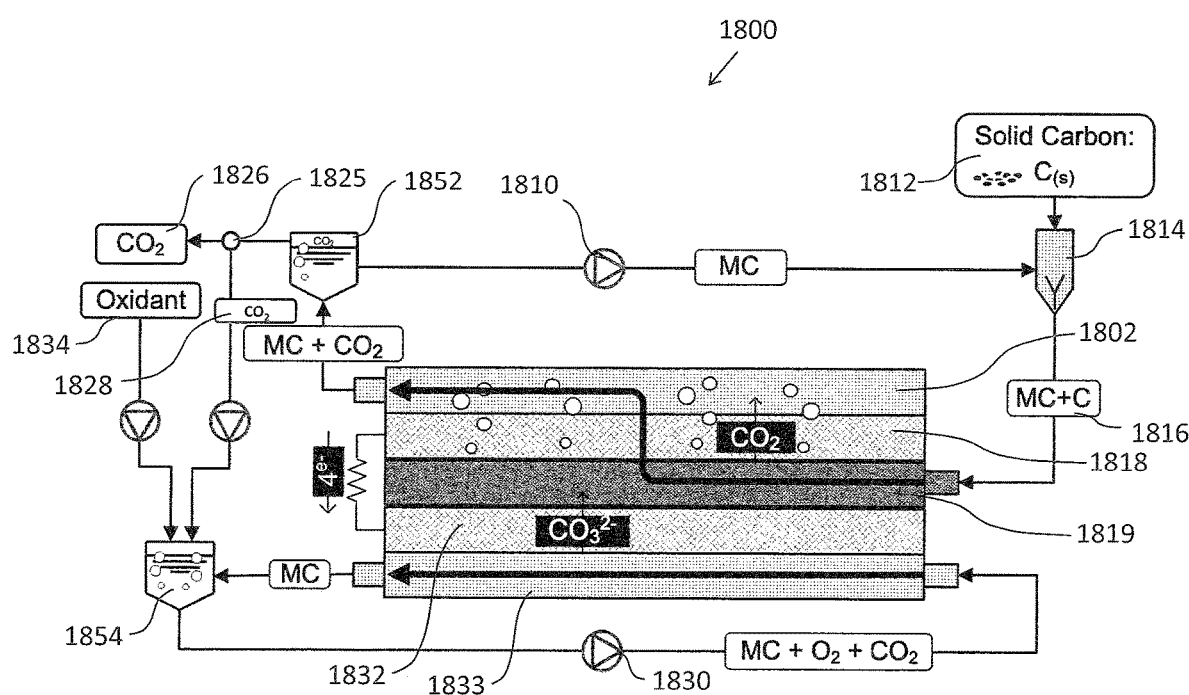
FIG. 18 is a schematic illustration of an embodiment of a molten carbonate direct carbon fuel cell system with molten carbon electrolyte circulation, carbon fuel slurry circulation, a flow-through anode configuration, and supply of reactants to the cathode in a liquid carrier.

One way to obviate the need to provide sealing at a gas/liquid interface in every unit cell of a MC-DCFC stack, is for the cathode reactants to also be delivered via a liquid carrier, in particular via the molten carbonate electrolyte. An embodiment of such a system 1800 is illustrated schematically in FIG. 18 System 1800 is illustrated for a single cell, but again it is understood that it could be a system comprising multiple DCFCs electrically connected in series and fed with the various process streams in parallel. System 1800 comprises an anode 1818, a cathode 1832. Solid carbon particles from a fuel supply 1812 are introduced into and combined with molten carbon electrolyte in a mixer 1814, and the resulting carbon/electrolyte slurry 1816 (part molten carbonate electrolyte, part solid carbon fuel) is circulated to flow field chamber 1819 between the anode 1818 and cathode 1832 using circulation pump 1810. Electrolyte from the slurry passes through porous anode 1818 into an electrolyte return chamber 1802. Carbon from the slurry is trapped and consumed at the porous anode 1818. Electrolyte which has passed through the anode (which can, in some cases, be substantially carbon-free electrolyte) carries product $CO_2$ gas which is separated from the electrolyte at separator 1852. Then more carbon is added to the circulating electrolyte at mixer 1814 and it is recirculated back to flow field chamber 1819.

Product $CO_2$ gas separated at separator 1852 can be split into two streams at 1825, one exhaust stream 1826, and one recirculation stream 1828 which, together with an oxidant (such as oxidant or air) from oxidant supply 1834, is entrained into molten carbonate electrolyte in an entrainment mixer 1854 and circulated via cathode reactant pump 1830 to cathode flow field chamber 1833 where it contacts cathode 1832. System 1800 can alternatively be configured such that sufficient product $CO_2$ is entrained in the carbon fuel carrier in the anode molten carbonate return chamber 1802, without the need for a downstream entrainment mixer. Dissolved $O_2$ and $CO_2$ react at the cathode to form carbonate ions which are conducted to anode 1818 to oxidize the solid carbon fuel particles in the fuel slurry. This liquid cathode approach can be used in the various configurations of MC-DCFC systems described herein and other configurations.

The quantity of reactants that can be entrained in the liquid cathode molten carbonate stream is a function of various parameters, including the gas solubility, temperature and partial pressure. To sustain the fuel cell reactions, the flow conditions (pressure, temperature and flow rate) must be set to ensure there is sufficient supply of reactants. The liquid cathode flow loop may therefore be pressurized and run higher flow rates than other reactant and working fluid streams.

This approach of supplying the cathode reactants in a liquid carrier (MC) can be applied in combination with the various other aspects and system embodiments described herein, and also in conventional MC-DCFC systems, for example, in which the molten carbonate electrolyte is entrained in a porous matrix interposed between the anode and cathode Some of the systems embodiments illustrated herein are shown with fuel cells having planar architecture and some are shown with fuel cells having tubular architecture. It should be understood that technology and features described herein can be adapted to be applied to MC-DCFCs with planar, tubular or other architectures. Some of the system embodiments illustrated herein have a flow-by anode configuration, some have a flow-through anode configuration and some have a hybrid flow-through/flow-by anode configuration. It should be understood that the various flow-through or flow-by systems described herein can modified to provide hybrid flow-through/flow-by systems. In any of the system embodiments described herein, the positions of heat exchangers and auxiliary equipment could be in different locations. The features of the various embodiments can be combined in different combinations.

Use of MC-DCFC in a Tri-Generation Pyrolysis (TGP) System and Process

Embodiments of the MC-DCFC systems described herein can be integrated into a tri-generation pyrolysis (TGP) system and process in which natural gas is converted to hydrogen gas and carbon, for example, via a pyrolysis process. In a TGP system, value in the resulting carbon by-product is extracted by converting solid carbon to electricity in a MC-DCFC as well as to pure $CO_2$ gas which can be sequestered or exported to other industrial processes.

Interpretation of Terms

Unless the context clearly requires otherwise, throughout the description and the "comprise", "comprising", and the like are to be construed in an inclusive sense, as opposed to an exclusive or exhaustive sense; that is to say, in the sense of "including, but not limited to";

"linked", "connected", "coupled", or any variant thereof, means any connection or coupling, either direct or indirect, between two or more elements; the coupling or connection between the elements can be physical, logical, or a combination thereof;

"herein", "above", "below", and words of similar import, when used to describe this specification, shall refer to this specification as a whole, and not to any particular portions of this specification;

"or", in reference to a list of two or more items, covers all of the following interpretations of the word: any of the items in the list, all of the items in the list, and any combination of the items in the list;

the singular forms "a", "an", and "the" also include the meaning of any appropriate plural forms.

Words that indicate directions such as "vertical", "transverse", "horizontal", "upward", "downward", "forward", "backward", "inward", "outward", "vertical", "transverse", "left", "right", "front", "back", "top", "bottom", "below", "above", "under", and the like, used in this description and any accompanying claims (where present), depend on the specific orientation of the apparatus described and illustrated. The subject matter described herein may assume various alternative orientations. Accordingly, these directional terms are not strictly defined and should not be interpreted narrowly.

Where a component (e.g. a substrate, assembly, device, manifold, etc.) is referred to above, unless otherwise indicated, reference to that component (including a reference to a "means") should be interpreted as including as equivalents of that component any component which performs the function of the described component (i.e., that is functionally equivalent), including components which are not structurally equivalent to the disclosed structure which performs the function in the illustrated exemplary embodiments described herein.

Specific examples of systems, methods, and apparatus have been described herein for purposes of illustration. These are only examples. The technology provided herein can be applied to systems other than the example systems described above. Many alterations, modifications, additions, omissions, and permutations are possible within the practice of this disclosure. This disclosure includes variations on described embodiments that would be apparent to the skilled addressee, including variations obtained by: replacing features, elements and/or acts with equivalent features, elements and/or acts; mixing and matching of features, elements and/or acts from different embodiments; combining features, elements and/or acts from embodiments as described herein with features, elements and/or acts of other technology; and/or omitting combining features, elements and/or acts from described embodiments.

While particular elements, embodiments and applications of the present disclosure have been shown and described, it will be understood, that the disclosure is not limited thereto since modifications can be made by those skilled in the art without departing from the scope of the present disclosure, particularly in light of the foregoing teachings. It is therefore intended that the following appended claims and claims hereafter introduced are interpreted to include all such modifications, permutations, additions, omissions, and subcombinations as may reasonably be inferred. The scope of the claims should not be limited by the preferred embodiments set forth in the examples, but should be given the broadest interpretation consistent with the description as a whole.

What is claimed is:

1. A direct carbon fuel cell system comprising:
   a plurality of fuel cells, each fuel cell comprising a porous fuel cell anode and a fuel cell cathode;
   a molten carbonate electrolyte;
   a fuel supply apparatus for flowing a fuel slurry comprising solid carbon particles and a carbon carrier fluid to the fuel cell anodes in parallel, wherein the carbon carrier fluid has a same composition as the molten carbonate electrolyte;
   an oxidant supply apparatus for flowing an oxygen-containing stream to the fuel cell cathodes in parallel; and
   an electrolyte circulation apparatus for circulating the molten carbonate electrolyte in contact with each of the plurality of fuel cells,
   wherein, during operation of the direct carbon fuel cell system to generate electric power, carbon is oxidized at the fuel cell anodes to produce carbon dioxide, and at the fuel cell cathodes oxygen and carbon dioxide react to produce carbonate ions,
   wherein each of the fuel cells further comprises an electrolyte flow field chamber interposed between the fuel cell anode and the fuel cell cathode, and a cathode flow field chamber separated from the electrolyte flow field chamber by the fuel cell cathode, wherein the oxidant supply apparatus is configured to flow the oxygen-containing stream into the cathode flow field chambers in parallel, and wherein the fuel supply apparatus is configured to flow the fuel slurry into the electrolyte flow field chambers in parallel, and
   wherein the fuel supply apparatus is further configured to circulate the fuel slurry through the electrolyte flow field chambers whereby, in each of the plurality of fuel cells, after the fuel slurry has been urged through the electrolyte flow field chamber, the fuel slurry is urged into the porous fuel cell anode so that at least some of the solid carbon particles contact the porous fuel cell anode and at least some of the carbon carrier fluid passes through the thickness of the porous fuel cell anode into an electrolyte return chamber, and at least some of the carbon carrier fluid exits the electrolyte flow field chambers via an outlet in the respective electrolyte flow field chamber.

2. A direct carbon fuel cell system according to claim 1, wherein the electrolyte circulation apparatus is configured to circulate the molten carbonate electrolyte through each of the plurality of fuel cells in parallel.

3. A direct carbon fuel cell system according to claim 2, wherein the electrolyte circulation apparatus is further configured to circulate the molten carbonate electrolyte through the electrolyte flow field chambers in parallel.

4. A direct carbon fuel cell system according to claim 1, wherein the fuel supply apparatus is configured to further circulate the fuel slurry through the electrolyte return chambers in parallel, so that the fuel slurry contacts the fuel cell anodes, and wherein the electrolyte circulation apparatus is configured to circulate the molten carbonate electrolyte through the electrolyte flow field chambers in parallel.

5. A direct carbon fuel cell system according to claim 1, wherein substantially all of the carbon carrier fluid from the fuel slurry supplied to each electrolyte flow field chamber passes through the thickness of the corresponding porous fuel cell anode.

6. A direct carbon fuel cell system according to claim 1, wherein at least some carbon dioxide product gas produced at the fuel cell anodes migrates through the fuel cell anodes and to the electrolyte return chambers.

7. A direct carbon fuel cell system according to claim 1, wherein the fuel supply apparatus comprises a fuel slurry circulation apparatus configured to flow at least some of the fuel slurry that has passed through the anodes out of the electrolyte return chambers, and wherein the electrolyte circulation apparatus is configured to combine the at least some of the carbon carrier fluid that has exited the electrolyte flow chambers via the outlets with the at least some of the fuel slurry that has been flowed out of the electrolyte return chambers.

8. A direct carbon fuel cell system according to claim 7, wherein the fuel slurry circulation apparatus and the electrolyte circulation apparatus each comprise one or more pumps, and wherein the one or more pumps are configurable to adjust respective flow rates of the at least some of the fuel slurry that has been flowed out of the electrolyte return chambers and the at least some of the carbon carrier fluid that has exited the electrolyte flow chambers via the outlets.

9. A direct carbon fuel cell system according to claim 3, wherein each of the plurality of fuel cells further comprises a cathode protection barrier interposed between the fuel cell cathode and its adjacent electrolyte flow field chamber.

10. A direct carbon fuel cell system according to claim 1, further comprising a gas flow path for directing exteriorly to the fuel cells at least a portion of product carbon dioxide gas produced at the fuel cell anodes to the electrolyte flow field chambers, wherein the at least a portion of product carbon dioxide gas produced at the fuel cell anodes and having exited the fuel cells is dissolved in the molten carbonate electrolyte prior to being directed to the electrolyte flow field chambers.

11. A direct carbon fuel cell system according to claim 1, further comprising a gas flow path for directing exteriorly to the fuel cells at least a portion of product carbon dioxide gas produced at the fuel cell anodes to the fuel cell cathodes, and a mixing chamber in the gas flow path, the mixing chamber for combining the at least a portion of product carbon dioxide gas produced at the fuel cell anodes with air to produce the oxygen-containing stream.

12. A direct carbon fuel cell system according to claim 1, wherein at least a portion of the carbon dioxide produced at the fuel cell anodes is entrained in the molten carbonate electrolyte and migrates to the fuel cell cathodes via the electrolyte flow field chambers.

13. A direct carbon fuel cell system according to claim 1, wherein the oxygen-containing stream is a liquid stream comprising molten carbonate electrolyte, oxygen, and carbon dioxide produced at the fuel cell anodes, and wherein the oxidant supply apparatus comprises an entrainment vessel for entraining carbon dioxide produced at the fuel cell anodes and oxygen into the molten carbonate electrolyte to produce the oxygen-containing stream.

14. A direct carbon fuel cell system according to claim 1, further comprising a heat exchanger, wherein the electrolyte circulation apparatus is configured to further circulate the molten carbonate electrolyte through a hot side of the heat exchanger.

15. A direct carbon fuel cell system according to claim 1, wherein the plurality of fuel cells are at least partially immersed in a molten carbonate electrolyte reservoir.

16. A direct carbon fuel cell system according to claim 15 wherein the direct carbon fuel cell system further comprises an immersion heater in the molten carbonate electrolyte reservoir for heating the molten carbonate electrolyte.

17. A direct carbon fuel cell system according to claim 15, further comprising a heat exchanger, wherein the electrolyte circulation apparatus is configured to circulate the molten carbonate electrolyte from the molten carbonate electrolyte reservoir, through a hot side of the heat exchanger and back to the molten carbonate electrolyte reservoir.

18. A direct carbon fuel cell system according to claim 1, wherein the fuel cells are of a tubular design.

19. A direct carbon fuel cell system according to claim 1, wherein the fuel cells are of a planar design.

20. A direct carbon fuel cell system according to claim 1, wherein each of the porous fuel cell anodes has an average pore size that is graded through a thickness of the fuel cell anode.

21. A direct carbon fuel cell system according to claim 20, wherein the pore size decreases continuously or in a stepwise manner in a direction of flow of fuel slurry through the porous fuel cell anode.

22. A direct carbon fuel cell system according to claim 21, wherein each of the plurality of porous fuel cell anodes comprises a structural support member for providing structural rigidity to its respective porous fuel cell anode.

23. A direct carbon fuel cell system according to claim 22, wherein the structural support member serves as a current collector for its respective porous fuel cell anode.

24. A direct carbon fuel cell system according to claim 1, wherein each electrolyte flow field chamber comprises:
- at a first end thereof, an inlet through which the molten carbonate electrolyte and the fuel slurry are flowed into electrolyte flow field chamber; and
- at a second end thereof, opposite the first end, the outlet through which the at least some of the carbon carrier fluid exits the electrolyte flow field chamber.

\* \* \* \* \*